United States Patent [19]
Lawlor et al.

[11] Patent Number: 5,485,626
[45] Date of Patent: Jan. 16, 1996

[54] ARCHITECTURAL ENHANCEMENTS FOR PARALLEL COMPUTER SYSTEMS UTILIZING ENCAPSULATION OF QUEUING ALLOWING SMALL GRAIN PROCESSING

[75] Inventors: Francis D. Lawlor, Austin, Tex.; Jerald E. Leitherer, Port Ewen; David B. Rolfe, West Hurley, both of N.Y.

[73] Assignee: International Business Machines Corporation, Armonk, N.Y.

[21] Appl. No.: 970,729

[22] Filed: Nov. 3, 1992

[51] Int. Cl.$^6$ .................................................. G06F 15/16
[52] U.S. Cl. .................. 395/650; 364/228.1; 364/228.3; 364/228.7; 364/241.8; 364/245.7; 364/243.1; 395/200.01; 395/800; 395/474; 395/280
[58] Field of Search .................. 364/DIG. 1, DIG. 2; 395/375

[56] References Cited

U.S. PATENT DOCUMENTS

| | | | |
|---|---|---|---|
| 4,333,144 | 6/1982 | Whiteside et al. | 364/200 |
| 4,402,046 | 8/1983 | Cox et al. | 364/200 |
| 4,584,639 | 4/1986 | Hardy | 364/200 |
| 4,636,942 | 1/1987 | Chen et al. | 364/200 |
| 4,663,709 | 5/1987 | Fujiwara et al. | 364/200 |
| 4,754,398 | 6/1988 | Pribnow | 364/200 |
| 4,807,111 | 2/1989 | Cohen et al. | 364/200 |
| 4,901,230 | 2/1990 | Chen et al. | 364/200 |
| 5,197,130 | 3/1993 | Chen et al. | 395/325 |
| 5,201,040 | 4/1993 | Wada et al. | 395/400 |
| 5,255,369 | 10/1993 | Dann | 395/200 |

FOREIGN PATENT DOCUMENTS 0205946  12/1986  European Pat. Off. .
0362903  4/1990  European Pat. Off. .

OTHER PUBLICATIONS

"A Thread Facility Based on User/Kernal Cooperation in the ZERO Operating System", S. Inohara et al., IEEE 1991, pp. 398–405.

Chastain et al, The Convex C240 Architecture, Supercomputing 1988 Proceedings, pp. 321–329, IEEE Comp. Society Press, Washington D.C. 14–18 Nov. 1988.

Dinning, Anne, A Survey of Synchronization Methods for Parallel Computers, Computer Magazine, Jul. 1989, V22 Issue 7 pp. 66–77.

Agarwal et al, Sparcle: An Evolutionary Processor Design for Large-Scale Multiprocessors, IEEE Micro, vol. 13, Iss:3 pp. 48–61, Jun. 1993.

*Primary Examiner*—Kevin A. Kriess
*Assistant Examiner*—Lucien Toplu
*Attorney, Agent, or Firm*—Whitham, Curtis, Whitham & McGinn; Floyd A. Gonzales

[57] ABSTRACT

An architecture uses a process, termed "encapsulation", by which queues and counters are only accessed through a special memory operand called "object storage". The system alone is in control of the object storage, and the user cannot access it directly at any time. If the user needs to access a queue, the user must request it from the system. The system will in turn provide such access by issuing the user a "token". This token is the only means of communication between the user and the requested queue. By providing threads to be dispatched to real processors without large operating overhead, through object storage, the operating systems do not need to wait for the system's dispatching process to complete. Operating systems can signal the system through the use of object storage that they are authorized to access the processor when needed and thus forego the long dispatching process. In addition, since real processors are not dedicated, they can execute other programs when not needed. Since the state of threads is unknown to the operating system and the object dispatcher is in charge, operating support is kept at a minimum, which in itself is an important advantage of the invention. The encapsulation process along with the queuing system used in the architecture lead to finer granularity.

8 Claims, 18 Drawing Sheets

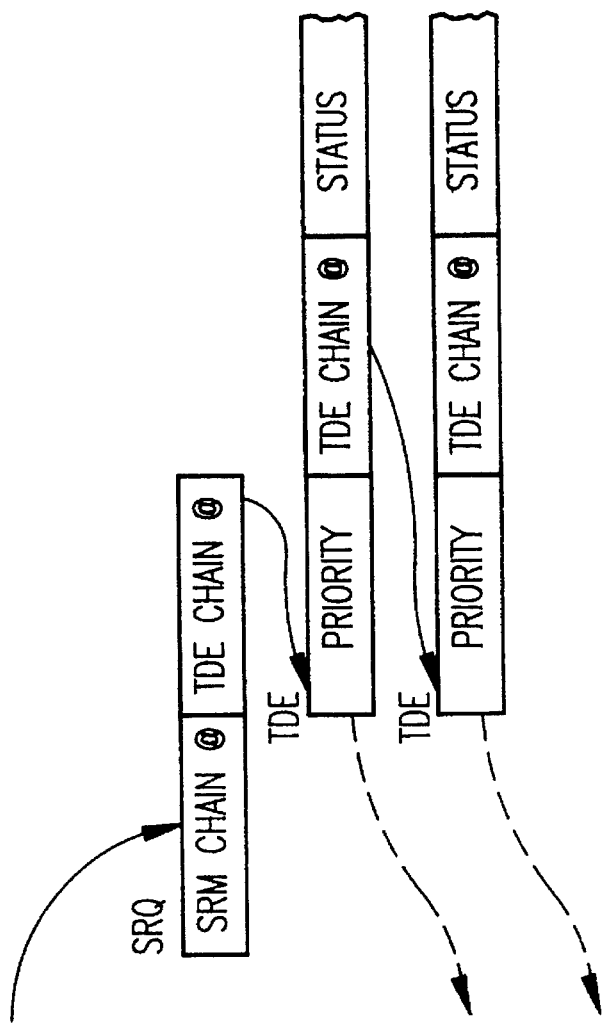
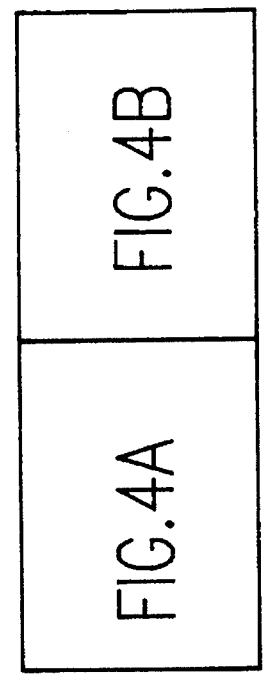
FIG.4B
FIG.4

ARCHITECTURAL ENHANCEMENTS FOR PARALLEL COMPUTER SYSTEMS UTILIZING ENCAPSULATION OF QUEUING ALLOWING SMALL GRAIN PROCESSING

BACKGROUND OF THE INVENTION

1. Field of the Invention

The present invention generally relates to efficient parallelization of programs in parallel computer systems and, more particularly, to a unique object-storage encapsulation of queuing, communication, and schedule/dispatch systems which provide efficient problem program parallelism. The invention provides architectural enhancements to existing operating system tasking structures that support "multi-tasking" or "multi-programming" in a parallel computer environment.

2. Definitions

COHERENCE (MEMORY CONSISTENCY) is the guarantee that there is logically only one copy of data even if there are multiple physical copies or even if it is shared by multiple processors. It includes no guarantees on atomicity, synchronization, sequentiality, etc.

CONCEPTUAL SEQUENCE is the view that instructions are executed one at a time, in order.

PHYSICAL SEQUENCE is the actual execution order by a physical processor, which may include execution of instructions out of conceptual sequence.

OBSERVED SEQUENCE is the actual order of instruction execution which is observed. This may or may not conform to the conceptual or physical sequence.

TASK SEQUENTIALITY is the guarantee that a task (process) views itself as executing instructions and referencing memory in conceptual sequence.

INTER-TASK SEQUENTIALITY (INTER-TASK CONCEPTUAL SEQUENCE) is the guarantee that a task can view other tasks as appearing to execute instructions and access memory sequentially (in conceptual sequence). This is important when independent tasks synchronize or communicate via shared data, but it is not generally important otherwise.

ATOMICITY (BLOCK-CONCURRENCY) is the guarantee that modifications to data appear to be completely done or not done, and never partially done.

SYNCHRONIZATION is the guarantee that an order or point of execution can be specified among two or more tasks. It is a guarantee that inter-task sequentiality, coherence and atomicity among the synchronizing tasks can be specified at that point.

CACHE as used herein refers to a primarily hardware managed, processor-logical storage, although software may assist.

PRIVATE STORAGE as used herein refers to software managed, task-local storage. This includes, for example, IBM System/370 registers.

DESCRIPTION OF THE PRIOR ART

Increasing demand for computer power has outstripped the capability of single processors (uniprocessors) to perform. High performance computers now require many processors operating in parallel. In one type of multiprocessor system, each of the processors share the same main memory; i.e., so-called tightly coupled parallel processors. In addition, numerically intensive computing applications are growing, placing a requirement for vector processing capability at very high speeds.

An example of a tightly coupled multiprocessor system is the IBM System/390 9000 series family of computers. The basic organization of a tightly coupled multiprocessor (MP) system comprises a plurality of processors which may be selectively connected to a plurality of independently addressable memory modules known as basic storage modules (BSMs). In a typical MP system, there may be N processors and M BSMs, where M is typically greater than N. Since all processors require equal access to the BSMs, there is some form of N×M switch, such as a cross-bar switch, which selectively connects a processor to an addressed BSM for storing and retrieval of dam.

These parallel multiprocessor hardware architectures promise considerable performance advantages over uniprocessor systems, but that promise has not been fully realized in practice. Although the MP systems have provided increased throughput for multi-job and multi-program applications, speed up for single job and single program applications (currently being referred to as parallel processing) has not been so readily achieved. Two methodologies have been used to employ shared processors in parallel processing architectures; through the system alone and through the dedication of real processors. In the first method, the operating system is in charge. If the operating system wants to dispatch the processor (and the queue), the operating system often must go through a large queuing dispatch process before any of the processors are made available, then a time-consuming context switch must occur to set up for the next thread. An example of this approach is disclosed in U.S. Pat. No. 4,177,513 to Hoffman et al. which describes the task handling apparatus for the IBM S/38 computer system. In the context of that system, a thread is a path of execution of a process, and the thread context is the task. When there are a large number of threads to be executed, system performance can be greatly affected. Therefore, up to now only threads of "large granularity" (i.e., having large numbers of instructions) could be processed efficiently in parallel. At present, even with the best computers available, operating system overhead in the dispatching process places a floor of about 5,000 instructions as the minimum grain size for efficient performance.

In the second method, the operating system holds one or more processors dedicated to parallel execution. When processors are dedicated, the context of a thread can be largely held among multiple threads, which reduces the dispatch path. Nevertheless, this method causes other inefficiencies because the dedicated processors are at times idle when the operating systems are not in use.

The following descriptions of the hardware facilities provided by supercomputers for control of parallel applications indicate the following:

All the systems provide specialized, fast hardware for the control of parallel threads of a parallelized job.

Most of the facilities provided require that the number of processors participating in the parallelism be statically determined and dedicated. An exception to this is one of the newer systems, CONVEX, which explicitly identifies this problem and which provides facilities to overcome the problem.

While effective allocation, if not dedication, of real processors is required for good turnaround performance of parallel jobs, the architectural requirement that processors be dedicated is undesirable in a virtual machine operating system, such as IBM's VM/OS, multiple virtual system operating system, such as IBM's MVS/OS or a UNIX operating system environment and undesirable during testing of applications.

Synchronization Mechanisms

The following sections discuss the synchronization mechanisms provided by various computer systems to support parallelism.

Cedar:

Cedar is a development of the Center for Supercomputing Research and Development at the University of Illinois at Urbana-Champaign. It is designed to consist of "clusters" of modified Alliant FX/8 processors. Each cluster consists of eight tightly coupled FX/8 processors. Multiple clusters may be coupled together with a shared global memory. S. P. Midkiff and D. A. Padua, in "Compiler Algorithms for Synchronism", IEEE Transactions on Computers, vol. C-36, no. 12, December 1987, state, "It is assumed here that each processor can be made to wait, until all pending memory accesses issued by it have been completed, by calling the routine wait_for_memory." There is no architectural guarantee of task sequentiality much less intertask sequentiality. S/370 always guarantees the former and will guarantee the latter when a synchronizing operation, e.g., compare and swap, is used. S. P. Midkiff and D. A. Padua, supra, discuss synchronism as follows:

"In any type of synchronization, two capabilities are needed. The first is the ability to wait until an action has occurred, and the second is the ability to signal that the action has occurred. The first is provided by the test instruction . . . which does not complete until the value of the variable is at least equal to the number [specified].

"The second capability is provided by the testset instruction . . . [which] tests the value of the variable . . . [and then] sets the argument to the current iteration number.

"The set instruction is used to signal [by setting a bit in an array] that some event has occurred, and the wait instruction is used to wait until that event occurs."

The test and testset instructions are an enhanced form of compare and swap in S/370, while the set and wait instructions are similar to test and set. This approach requires dedication of processors and spin waiting.

CONVEX C Series:

The Convex Computer Corporation approach provides up to four-way tightly coupled processors. CONVEX UNIX uses the scheduling capabilities of the hardware architecture to implement its mechanism, avoiding the serial bottleneck present on most parallel systems. The system contains a set of global registers to allow communication between processors. Each executing process is allocated one of eight sets of communication registers. Any or all of the CPUs in the system can simultaneously reference the data in a given communication register set by simply loading the appropriate index into an index register. Instructions are provided for the loading and retrieving of data from the communication registers, the locking of individual registers, and for requesting that additional processors join in a computation.

CONVEX systems implement the division of a program into multiple parts and the synchronization of those parts in hardware, virtually eliminating the software overhead usually associated with parallel processing. This allows CONVEX systems to execute in parallel even very short pieces of parallel code, allowing the parallelization of many more parts of a typical program. While this in itself is not a new idea, traditional parallel processing systems force CPUs to be preallocated to a program which wants to use them. This means that no other job may use those processors while a job is running. This is all right in an environment where only one program ever runs, but in practice few systems exist in this environment.

To correct this deficiency, CONVEX systems provide a mechanism for a job to acquire additional CPU resources. CONVEX has implemented an asynchronous mechanism which does not require CPUs to be slaved to a CPU executing parallel code. When a CPU executing a parallel program reaches a portion of the code which can be executed in parallel, it simply posts a flag, called a fork request, in its communications register set. The processor then continues executing the program.

Any CPUs not executing a program execute a special microcode loop called the ready state. In the ready loop, CPUs scan through all the communication registers looking for a request for help posted by a processor executing a parallelizable application. When they find one, they join in the computation, immediately increasing the rate at which an application executes. CONVEX calls this feature "Automatic Self Allocating Processors", or "ASAP". ASAP allows a single program to use all the resources of an entire system.

CONVEX UNIX is extensively tuned to minimize overhead and reduce bottlenecks. The system itself is semaphored for parallel execution. The scheduling system is designed around the parallel processing capabilities of the hardware, allowing the hardware thread creation activities to proceed without OS intervention. In a heavily loaded environment, threads are created on a priority basis, ensuring that the programs with the highest priorities get the most CPU resources.

The CONVEX implementation demonstrates recognition of a number of things, including 1) the need for hardware to assist in synchronization of parallel threads, 2) the limitations of OS software in thread definition and dispatching, 3) the need for hardware assists in thread dispatching, 4) the inadequacy of static dedication of processors to a job, and 5) the need for dynamic allocation of processors.

Cray X-MP:

Kai Hwang in "Multiprocessor Supercomputers", IEEE Computer, June, 1985, describes the Cray X-MP supercomputer as providing up to four-way tightly coupled processors. The four CPUs intercommunicate and synchronize via five clusters of shared registers. The operating system allocates the clusters to the CPU. An allocated cluster may be accessed by the CPU in either user or supervisor mode. The Cray operating system is designed to support concurrent independent uniprocessor jobs, multiprocessing of a single job, and multitasking that executes two or more parts of a program (tasks) in parallel sharing a common memory space, resulting in substantial throughput improvements over serially executed programs.

This approach has severe problems from a resource management point of view. How, for example, are these bits allocated within a single application or certainly among multiple applications which may be on the system at one time? Depending on how this is managed, it may rule out more than one job running at a time; otherwise, there would be conflicts between two jobs, unless clusters are dedicated to jobs.

Kai Hwang, supra, states,

"All of these capabilities are made available through library routines that can be accessed from Fortran. In addition, hardware provides built-in detection of deadlocks within a cluster of processors."

This implies dedication of processors and a number of tasks less than or equal to the number of physical processors.

Another resource management problem arises if the machine is not dedicated to a job. When one task of the job completes its timeslice and is swapped out, another task from another job cannot be started which tries to use the resource since other tasks from the first job may still be running on other processors. If a job is swapped out, the state of this resource would have to be saved and reloaded when the job is restarted. Additionally, there are load balancing and scheduling problems and no protection within or among jobs.

Denelcor's HEP:

Kal Hwang, supra, describes this system as comprising up to sixteen-way tightly coupled processors, providing unlimited addressing and eliminating data dependency delays by direct internal data forwarding through the shared data memory modules. Synchronism is done by hardware. S. P. Midkiff and D. A. Padua, supra, describe the system as follows:

"Full/Empty Synchronism (FES) was first implemented on the Denelcor HEP . . . In FES a one bit key is associated with each data word. This key asserts that the data word is either full or empty. When a data word is read with a synchronized read, the key is set to empty, and when written with a synchronized write, it is set to full. By examining the state of the key, it can be determined if it is safe to read or write the corresponding word.

"A major drawback to FEX is that a word can only be in two states. If a word is read and written several times in a single loop, more than two states are needed to represent its disposition. To this end some variables will be replaced by a structure with two components. One component, DATA, will hold the value associated with the variable, and the other component, KEY, will hold the integer variable used for synchronized operations. By providing integer keys instead of single bits, many states for each data word can be represented. For our purposes it is necessary to be able to set the key to a constant, or to increment it by one."

This not only points out one of the problems with the HEP approach, but it also defines a "counter". It does not point out that HEP is inefficient in providing a separate flag for every memory word when in many circumstances, such as barriers and doacross, only one "key" or counter is necessary to synchronize an arbitrary number of iterations. A single counter is adequate in a doacross whenever it is only necessary to know that iteration N has set its variable. It is always adequate to perform a barrier, while the HEP approach is always inadequate.

Another major problem with the HEP approach is that the synchronized communication of data is through memory and therefore cannot run faster than memory speed. In some applications, this may not be fast enough.

Other Key Elements

Counters and Queues:

Counters and queues are generic concepts and are described in many basic programming books on data structures. The counters and queues as used in the practice of the subject invention, however, owe many of their features and characteristics to the counters and queues defined originally in the System/38 as part of its internal machine programming interface, which is an interface approximately equivalent to the architected S/370 machine interface, but not seen directly in the S/38 by application programmers. The counters and queues of the S/38 are described in the patent to Hoffman et al., supra, and in IBM publication SC21-9037.

The functional capabilities and instruction set of the counters and queues as used herein are similar to those of the S/38 but differ in certain very important ways necessary for the support of fine grain parallelism.

Micro-dispatching:

An important element of dispatching fine-grain (i.e., small) units of work is providing for a very efficient means of dispatching the units of work. The typical system dispatchers of the MVS and VM operating systems take thousands of instructions to dispatch a piece of work. A typical rule of thumb is that for a sixteen processor system, this would require the units of work to be about ten times the path length of the dispatching code in order to provide reasonable efficiency. Thus, grain sizes of tens of thousands instructions are the smallest which could be supported. It is a goal of the subject invention to support grain sizes on the order of a thousand instructions and to provide an architectural approach in which the supportable grain size could be arbitrarily reduced by devoting hardware to reducing the overheads.

In contrast, Cray's initial offering suffered from the high dispatching overhead of its multi-tasking dispatcher. This was also true of IBM's initial offering, the FORTRAN Multi-Tasking Facility (MTF). Cray then provided a "micro-dispatching" facility, and IBM has since announced Parallel FORTRAN. These newer offerings provide application specific "micro-dispatchers" which incur less overhead than the general purpose system dispatchers. This is a technique that has been used for many years by products such as IMS, CICS, and the like, to reduce dispatching overhead. While the overhead to the software is reduced to a minimum, the supportable grain size is still limited to the order of about 10,000 instructions. Significant improvements beyond this are not expected through purely software approaches; therefore, some type of hardware support is required.

Multi-Threading Operating Systems:

Multi-threading operating systems, such as IBM's OS/2 version 2.0 for personal computers and Sun Microsystems' Solads, are now available, and new multithreading operating systems, such as Microsoft's Windows NT and the Posix multithreading standards for Unix, will be released in the near future or are proposed. The multithreading operating systems permit real processors to be accessed without large operating system overhead in the dispatching process.

While the subject invention employs the concept of "threads", it does not require a multi-threading operating system on which to run. In fact, the concept of "threads" is unknown to the VM and MVS operating systems, yet these operating systems are capable of supporting the invention.

The Problem Solved by this Invention

There is currently no defined high-level scientific and engineering language interface for parallelism. Parallelism requires the creation and management of parallel processes within a job. Products such as Multi-Tasking FORTRAN (MTF) have demonstrated the feasibility and value of this, but they have also illustrated the high overhead associated with process management using current operating system facilities, such as IBM's Multiple Virtual Storage (MVS) or Virtual Machine (VM) operating systems. Alan H. Karp and Robert G. Babb II have provided an overview of parallel FORTRAN in "A Comparison of 12 Parallel Fortran Dialects", IEEE Software, Sept. 1988, pp. 52–67. For fine grain (less than 1000 operations) and medium grain (less than 10,000 operations) parallelism, more efficient process management facilities are required. Generally, it is not feasible to write a new operating system and abandon the old one; therefore, an approach which achieves the necessary objectives within the existing operating systems is required.

SUMMARY OF THE INVENTION

It is therefore an object of the present invention to provide an architectural basis within existing multiprocessor systems for support of high performance, fine grain parallelism.

It is another object of the invention to support a wide range of high level parallel functions by providing a set of primitives that are the basis for general multi-thread, multi-task management.

It is a further object of the invention to provide parallel architectural enhancements which define operations in such a way that a wide range of implementations are possible without reference to memory operations.

It is yet another object of the invention to provide a high degree of system integrity without suffering overhead of system services.

It is yet a further object of the invention to provide for system ease of use, both for the operating system and the end user, in a parallel programming environment.

According to the invention, an architecture is provided which uses a process, termed "encapsulation", by which queues and counters are only accessed through a special operand called "object storage". The facility alone is in control of the object storage, and the user cannot access it directly at any time. If the user needs to access a queue, the user must request it from the system. The system will in turn provide such access by issuing the user a "token". Tokens are only valid in the context in which they were issued. This token is the only means of communication between the user and the requested queue. Hence, context switching is not required for dispatch.

By providing encapsulated communications, objects and functions, the facility allows threads to communicate without incurring system overhead. A thread is defined as the smallest unit or path of execution through a process that can be scheduled. Operating systems can signal the system through the use of object storage, and the facility can recognize when threads are authorized to access the objects to permit communications without employing the operating system dispatching process. In addition, since real processors are not dedicated, they can execute other programs when not needed. In fact, the other programs may also employ object dispatching of threads within their context. Indeed, since the state of threads is unknown to the operating system and the object dispatcher is in charge, operating support is kept at a minimum, which in itself is an important advantage of the invention.

The encapsulation process along with the queuing system used in the architecture lead to finer granularity. The queuing system is the same as that used in IBM's S/38 computers described in the patent to Hoffman et at., supra. However, by applying the teachings of this invention, the minimum number of machine cycles can be reduced from 10,000 to approximately 100, an order of two magnitude reduction. Thus, the invention solves not only the problem of inefficient processor use, it also greatly improves granularity.

The primary thing limiting performance in current systems is memory access time. For this reason, memory operands are avoided on all performance sensitive operations. Unlike the S/38, the counters and queues do not reside in memory. Instead, they reside in the "object storage". The performance of this storage, and its connectivity to processors, can be determined independently of main storage. Thus, it can be made as fast as necessary to meet the required performance goals of a particular application.

Another element contributing to an improvement in performance is the structure of system interrupts. Under the architectural enhancements according to the invention, no interrupts occur while queuing instructions are being processed. Interrupts may occur between the instructions, but none can occur during an instruction. This improves speed and performance by preventing the holder of a lock that protects a critical resource from being interrupted. These locks are required for the implementation of the facility, but they are invisible to the user because of the atomic execution of functions.

The architecture of the invention provides integrity features, such as authorization, sharing and the like, consistent with the environment in which it is being used. In existing systems, one can use "problem-state" instructions to construct the parallelism primitives or "supervisor-state" services. The problem-state approach is more efficient, but it provides no integrity, or protection, from intentional or accidental misuse. The invention provides the efficiency of problem-state operation, yet the integrity of supervisor-state services.

The integrity is provided in a couple of ways. First, the "object storage" in which the counters and queues are held is not accessible via normal instructions, thereby preventing both accidental and intentional damage to the objects. Second, the definition of object spaces as "associated" with regular address spaces means that users have addressability to any object space to which they have addressability to the regular "associated" address space. Thus, whatever mechanisms are provided by the operating system for sharing address spaces (which may be different in different operating systems) also provides accessibility to the associated object spaces. This not only provides integrity consistent with the current operating system philosophy, but it also avoids the need for yet another integrity architecture for object spaces and corresponding hardware and software expense to support it. Such a flexible integrity protection is totally lacking in current parallel systems.

Because the architecture is mostly problem-state instructions allowing efficient direct use by application code, the invention makes the implementation of compilers supporting application parallelism simpler. This is done by providing the compiler designer with machine language level constructs to create and control parallelism in the application. The instructions, being problem-state, can be generated as inline code by the compiler, avoiding the inefficiencies of operating system calls. The compiler designer no longer needs to create the algorithms and data structure to establish a parallel application environment or make system calls to supervisor services which degrade performance. This system is also available to the assembler language programmer.

Still another element that improves performance is the invention's Fixed Task Dispatching Element (FTDE) which recruits processors as they become available and provides dynamic recruitment of available processors. In a dynamic environment with many processors, the number of processors available to do work can vary significantly over time. When a parallel piece of work is started, only a few processors may be available, but shortly thereafter, more may become available. In some cases, it is desirable to "recruit" these processors to help. This dynamic recruitment of processors to participate, thereby rebalancing the load, can result in faster processing of the job.

The object storage can be implemented in hardware by use of registers or hardware arrays. It can also be implemented purely by the use of software devices. However, the more the object storage is implemented in software, the less performance improvement will be gained. With the architecture which implements the object storage according to the invention, the computer system can be fine tuned by providing a combination of hardware and software access to create the level of performance desired.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The invention will be disclosed in the context of architectural enhancements to IBM's S/370 computer systems to support application parallelism, and more particularly in a ESA/370 (Enterprise Systems Architecture) environment, as described, for example, in IBM Enterprise Systems Architecture/370, Principles of Operation, publication SA22-200-0. The operating systems which are in current use on these computers are the Multiple Virtual Storage (MVS) and Virtual Machine (VM) operating systems (OS). A general understanding of these operating systems may be had by reference to An Introduction to Operating Systems by Harvey M. Deitel, Addison Wesley (1984), Operating Systems by H. Lorin and H. M. Deitel, Addison Wesley (1981), and by Harold S. Stone in High-Performance Computer Architecture, Addison-Wesley (1987). It will be understood, however, that the invention is not limited to either the hardware architecture of the S/370 computer systems or the MVS or VM operating systems.

The subject invention is characterized as a small grain facility (SGF) which provides an application program with a small set of instructions that can be used to establish and manage a parallel programming environment with an absolute minimum of software or hardware overhead. This permits the speedups derived from the running of relatively small code segments in parallel to be realized rather than being swamped by the overhead associated with running them in parallel.

Supervisor state dispatching of tasks in MVS or virtual processors VM is too inefficient for fine grain (less than 1000 operations) or medium grain (less than 10,000 operations) parallelism. In order to improve the performance of fine and medium grain parallelism, the compilers and operating systems make use of new facilities provided by the invention which provide efficient "multi-tasking" or "multi-programming" within the existing operating system tasking structures. From an operating system viewpoint, this new facility effectively looks simply like register changing and branching, not a competing and conflicting system dispatcher. This new facility is referred to as thread dispatching.

Thread dispatching is performed by a thread dispatcher which uses a number of special objects. The contents of these structures are not directly addressable by the user but are "created" by the user and may then be referenced in appropriate instructions. The content and purpose of these structures can be understood by considering what is required to define, dispatch and synchronize parallel units of work. When the compiler defines a parallel unit of work, it must have some way of describing where in the program execution it is to begin and its initial state (e.g., general purpose register contents). The Thread Dispatching Element (TDE) defined below serves this purpose.

Figure 1:
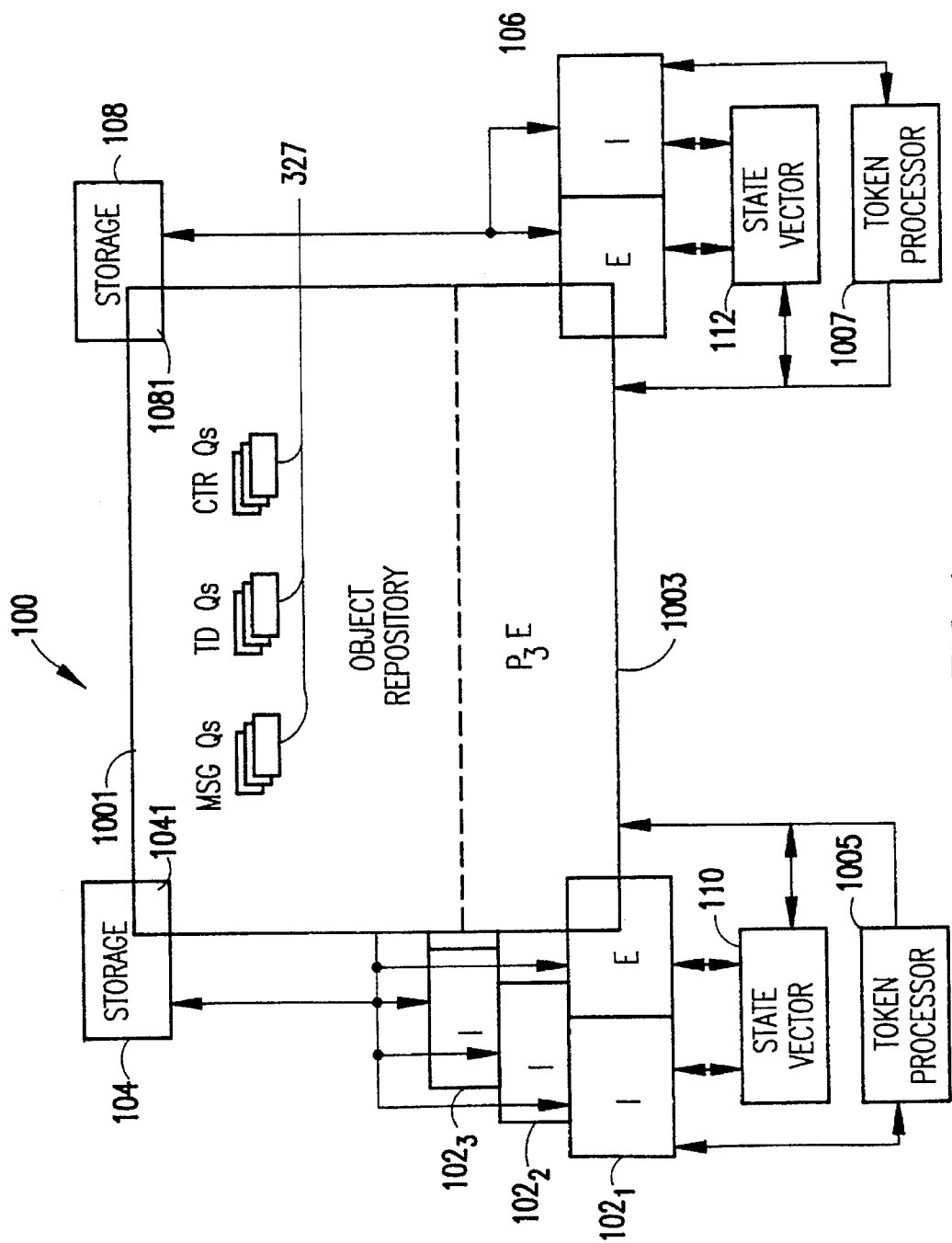
FIG. 1 is an overall block diagram of a parallel processor system incorporating the small grain facility (SGF) according to the invention.

Referring now to the drawings, and more particularly to FIG. 1, there is shown an overall block diagram of a parallel processor system incorporating the small grain facility (SGF) 100 according to the invention. This parallel processor system includes both tightly coupled and loosely coupled processors to illustrate the general application of the SGF 100. More specifically, in FIG. 1, to the left of the SGF 100 are a plurality of processors $102_1$, $102_2$ and $102_3$, which share a common storage 104. Thus, the processors to the left of the SGF 100 constitute a tightly coupled multi-processor system. To the right of SGF 100 in FIG. 1 is another processor 106 having a storage 108. Since the storages 104 and 108 are separate, the processor in combination with processors $102_1$, $102_2$ and $102_3$ constitute a loosely coupled mulitprocessor system. In FIG. 1, each of the processors is diagrammatically represented by two blocks designated as "I" for Instruction Unit and "E" for Execution Unit. Associated with the processors $102_1$, $102_2$ and $102_3$ is a state vector (SV) register 110. A similar SV register 112 is associated with processor 106. The SGF 100 itself is composed of an object repository 1001, a parallel execution processor (here designed as $P_3E$) 1003, and token processors 1005 and 1007 associated respectively with processors $102_1$, $102_2$ and $102_3$ and with processor 106. The object repository 1001 contains Messages Queues, Thread Dispatching Queues (TDQs) and Counter Queues.

In FIG. 1, the state vector (SV) register 110 holds the operating and control state of the processors $102_1$, $102_2$ and $102_3$. From this state, the context of the program is determined by the token processor 1005, shown in more detail in FIG. 3. Similarly, the SV register 112 holds the operating and control state of processor 106 from which the context of the program is determined by the token processor 1007. It will be noted that in this diagram, a portion of the SGF 100 overlaps the storage 104 and the storage 108, as indicated by respective dotted lines 1041 and 1081. This indicates that the object repository need not be physically located in a separate storage but rather may be distributed between the storages 104 and 108. Although distributed between the storages 104 and 108, a user (i.e., application program) does not have access to the object repository, this being accessible only by the token processors and $P_3E$ units. Similarly, a portion of the SGF 100 overlaps the execution units of the processors $102_1$, $102_2$ and $102_3$ to the left and the processor 106 to the right. This indicates that $P_3E$ 1003 need not be a separate execution unit from those of the processors $102_1$, $102_2$ and $102_3$ and the processor 106. The $P_3E$ processor is typically distributed among the several processors, either as an integral pan of the processors or as a co-processor module for each of the processors. The dotted line overlap also indicates the logical relationship established when the token processor associates an object with a problem program during the create operation.

Figure 2:
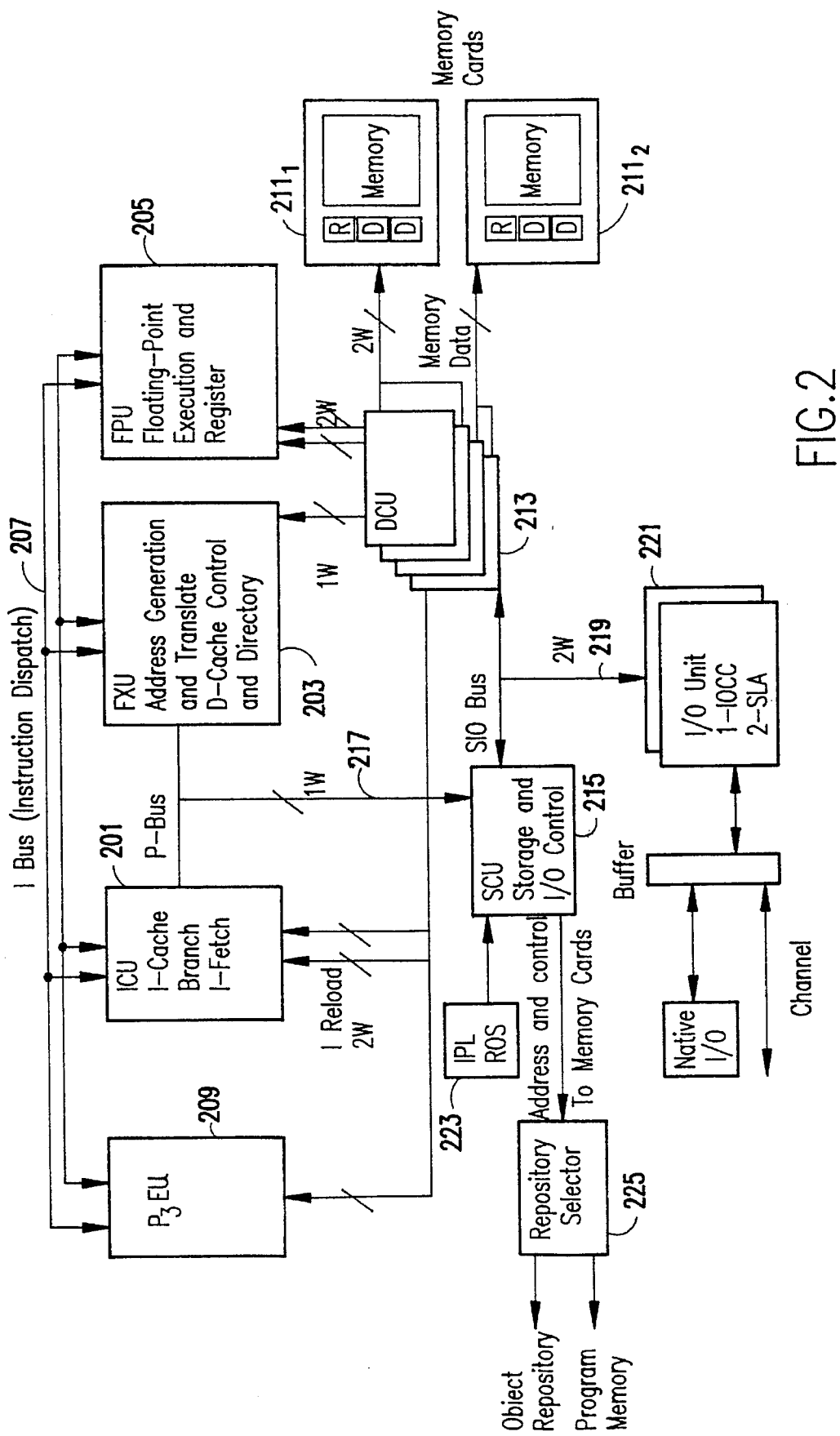
FIG. 2 is a block diagram of one of the parallel processors in the system of FIG. 1 showing in more detail the token processor and object addressing queuing facilities.

FIG. 2 is a block diagram of a typical one of the processors $102_1$, $102_2$ and $102_3$ and processor 106. The processor has an Instruction Control Unit (ICU) 201, a FiXed point Unit (FXU) 203 and a Floating Point Unit (FPU) 205, all connected by an Instruction (I) Bus 207, as is typical of modem processors. In addition, a $P_3E$ Unit ($P_3EU$) 209 is connected to the I Bus 207. The $P_3EU$ 209 may be physically part of the processor or may be a separate chip on the processor module, much like a math co-processor common to many architectures. The ICU 201, FXU 203, FPU 205, and $P_3EU$ 209 each communicate with a plurality of memory cards $211_1$ and $211_2$ through a Data Control Unit (DCU) 213. In addition, a Storage Control Unit (SCU) 215 communicates via a P-Bus 217 with the ICU 201 and FXU 203 and via an SIO Bus 219 with the DCU 213 and Input/Output (I/O) Unit 221. The SCU 215 at power on supplies the Initial Program Load (IPL) routine from Read Only Storage (ROS) 223 to the ICU 201. In addition, the SCU 215 provides address and control outputs to the memory cards $211_1$ and $211_2$ via a repository selector 225 which determines whether the storage addressed is part of program memory (e.g., user or application memory) or part of the object repository, which is partitioned from the program memory in a distributed system.

From the forgoing, it will be appreciated that the processor shown in FIG. 2 is generally conventional except for the addition of the $P_3EU$ 209 and the repository selector 225, these being part of the SGF 100 shown in FIG. 1.

Figure 3:
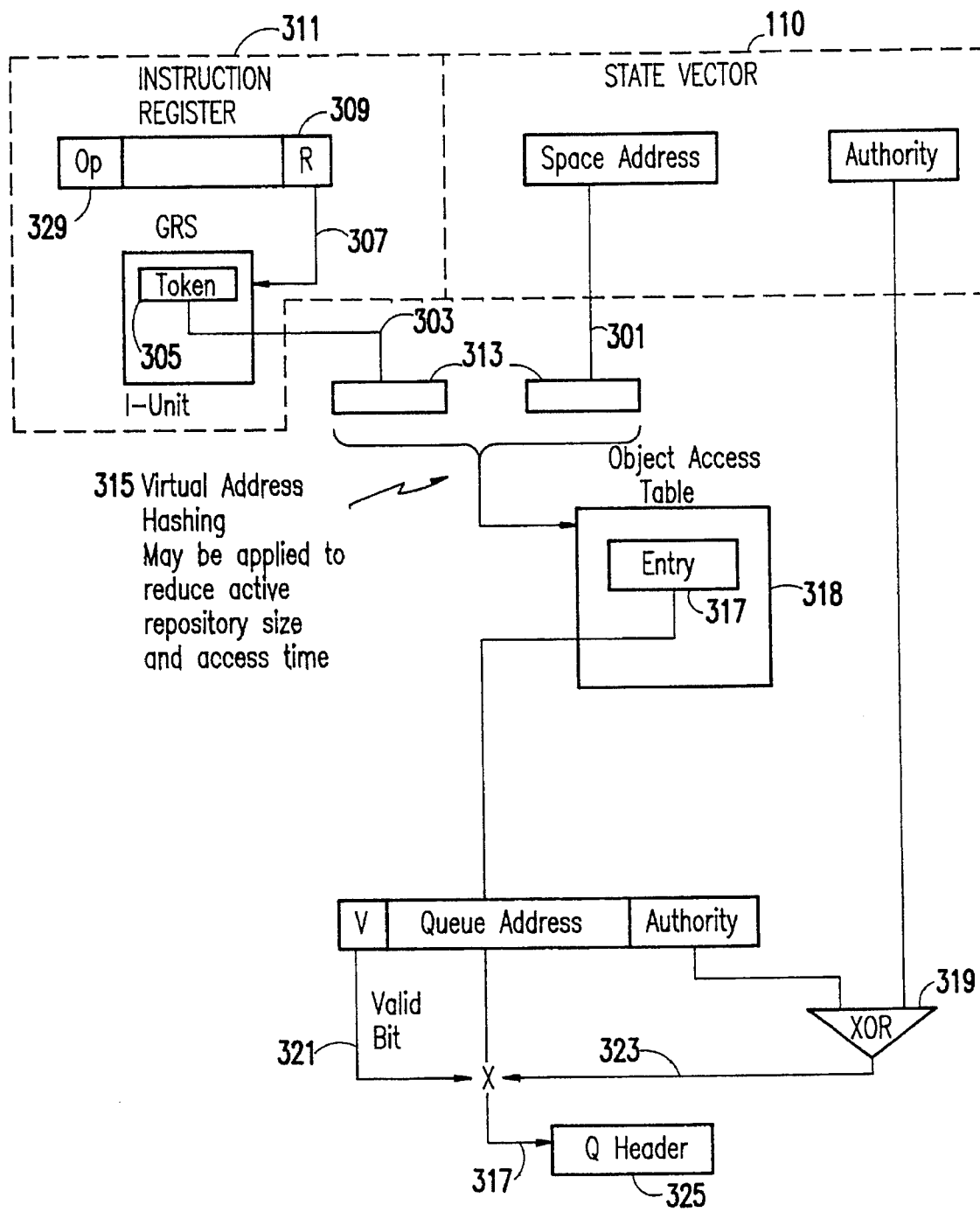
FIG. 3 is a block diagram showing the token processor data flow for encapsulation.

FIG. 3 is a block diagram showing the token processor data flow for encapsulation. In the preferred environment, the space address output 301 from the SV register 110, in FIG. 3, is used for context determination when converting the token 305 output on line 303. The token 305 is selected by the output on line 307 from operand register (R) 309 in I-Unit 311 into an address 313 for selecting 315 an entry 317 from the object access table 318. The entry 317 can be further examined 319 for usage authority by comparing the authority context of the state vector 110 with the authority defined for the object access entry 317. If the object access entry 317 is valid (V) 321 and authority comparison 323 authorizes the usage, queue header 325 is used to access queues 327 (shown in FIG. 1) to perform the function described by operation code (Opcode) decoded 329 in I-unit 311, shown in FIGS. 1 and 3. The object repository 1001 contains the queues for the various functions as described in more detail hereinafter. When the queue is selected, the function is performed by the $P_3E$ Unit 1003, which includes a task dispatcher as described in the Hoffman et al. patent, supra.

As depicted in FIG. 1, object repository 1001 can be addressed in a manner consistent with processor storage, making it appear to be in a common address range as suggested by memory sections 1041 and 1081. This can also facilitate hashing algorithms noted in 315 of FIG. 3.

Figure 4A:
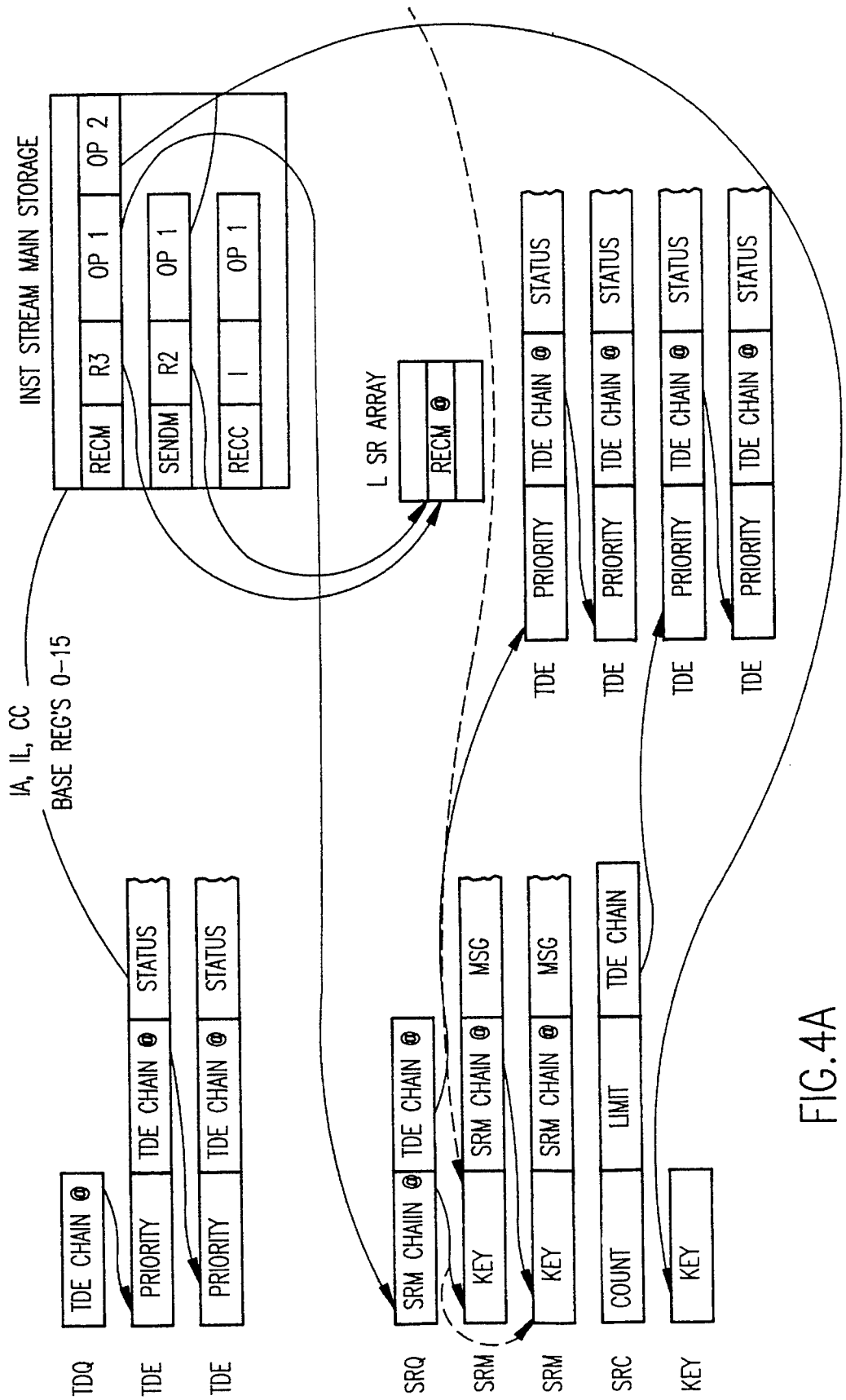
FIG. 4, comprised of A+B, is a block diagram illustrating interrelationships between a TDQ, SRQ, SRC, instruction stream and base registers.
Figure 5:
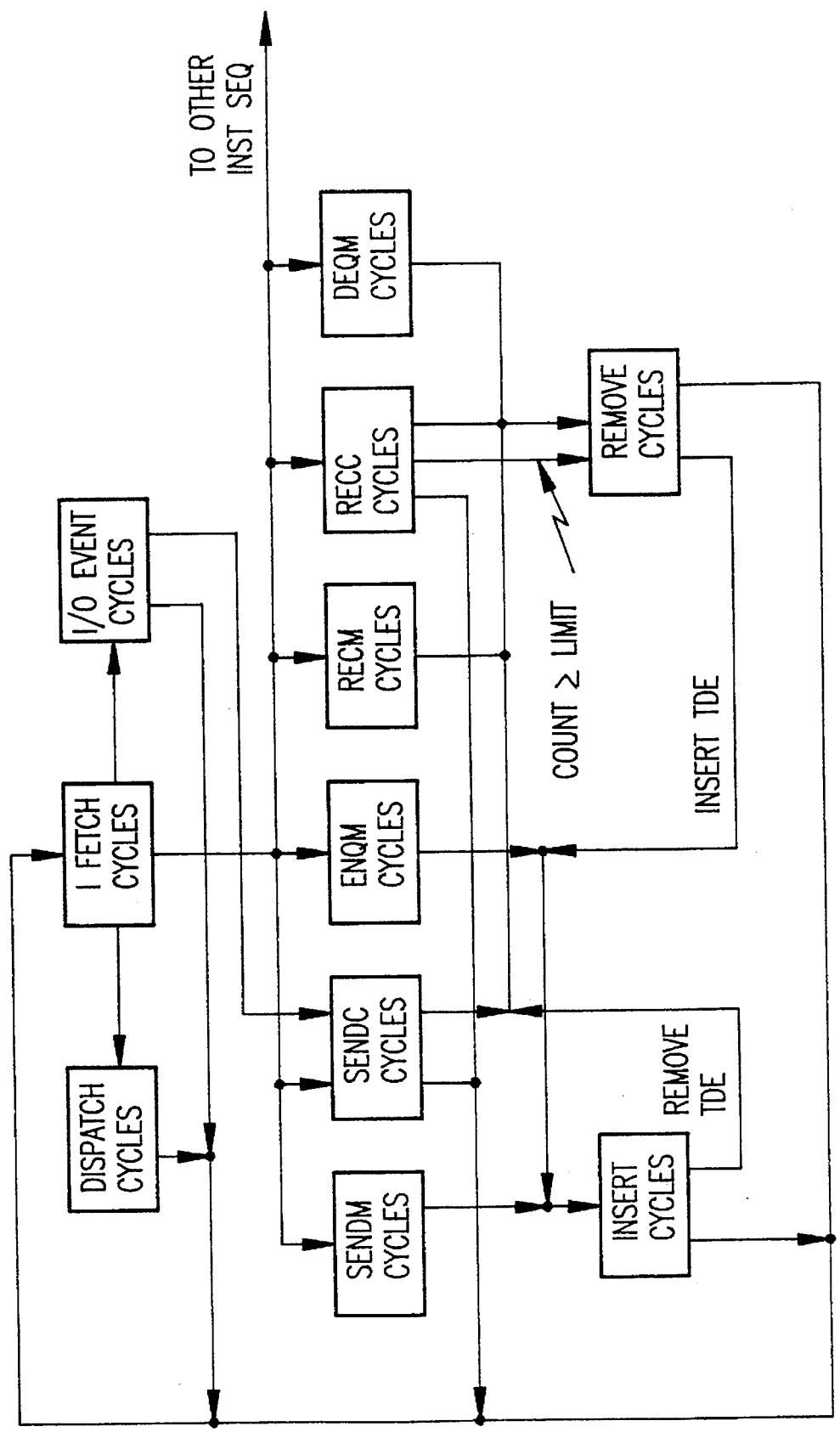
FIG. 5 is a block diagram illustrating control unit cycle sequence interrelationships.

FIG. 4 is a diagram illustrating interrelationships between TDQ, SRQ, SRC, instruction stream and base registers, and FIG. 5 is a diagram illustrating control unit cycle sequence interrelationships, as described in the patent to Hoffman et al., supra. The execution of the send message instruction is generally shown in FIG. 4. Specifically, the send message instruction enqueues the message defined in the I-field of the send message instruction; i.e., the R2 register, to a SRQ specified by the OP 1 field in the send message instruction. The TDEs on the wait list of the specified SRQ are enqueued to the TDQ in priority sequence. In FIG. 4, LSR is the local storage register array which refers to registers such as GPRs, FPRs, ARs, etc.

The task handling apparatus includes a task dispatcher and an intertask communication mechanism. The task dispatcher renders the highest priority task dispatching dement (TDE) on a task dispatching queue (TDQ) active. TDEs are on the TDQ in priority sequence. There are N levels of priority. Each task has a priority key which can be changed under program control. The active task causes instructions to be executed whereby work is performed, or it communicates with other tasks requesting the other tasks to do some work. The other tasks are either in an inactive dispatchable or inactive waiting state. The instruction fetch cycle of the active task always first tests for the need to execute I/O event cycles or dispatch cycles. The status of an I/O device is obtained during I/O event cycles. Dispatch cycles provide for storing the status of the old task dispatching element (TDE) and for loading the CPU facilities with the status of the new TDE. Task status includes an instruction address, instruction length count, condition code and base registers.

Almost every discussion of parallelism in the literature discusses "semaphores" and their use in synchronization. The Thread Send/Receive Counter (SRC) discussed below is essentially a high function semaphore. The literature also discusses the use of queues for synchronization and the communication of information. The Thread Send/Receive Queue (SRQ) provides this function. When a thread uses a Thread Send/Receive Counter or a Thread Send/Receive Queue, it may have to wait for the desired condition to be satisfied. When this occurs, the thread dispatcher must save its state and dispatch another unit of work. The Thread Dispatching Element (TDE), again, provides the resource for saving the state of the thread. In short, these new facilities can be viewed as a mechanism providing an efficient means for multi-programming units of work within an existing operating system dispatchable unit (e.g., an MVS Task). This is similar to the definition of threads in IBM OS/2 for personal computers. All of these structures are defined in more detail below. The number of Thread Send/Receive Counters (SRCs), Thread Send/Receive Queues (SRQs), Thread Dispatching Queues (TDQs), and Thread Dispatching Elements (TDEs) is model dependent.

Thread Dispatching Queue (TDQ)

A TDQ is a header which may contain a queue of Thread Dispatching Elements (TDEs) which are available to be dispatched. TDEs are ordered on a TDQ in ascending priority sequence (lowest value first, highest value last) by placing them on the queue according to the value in their priority field. A TDE is enqueued last within its priority so that TDEs will be serviced first in, first out (FIFO) with any given priority. This defines priority enqueuing of a TDE. A TDQ is "associated" with each SRC (Thread Send/Receive Counter) and SRQ (Thread Send/Receive Queue). The TDQ associated with an SRC or an SRQ is the TDQ to which TDEs are moved when they become dispatchable. SRCs which have the Short Wait Option set and which have waiting TDEs are said to be "SRCs in short wait". If the TDQ has associated SRCs which are in short wait, then the TDQ is said to have associated short wait SRCs. There is a special consideration of short wait SRCs by the thread dispatcher. If a program attempts to reference an invalid TDQ (using a valid instruction), a specification exception occurs. A TDQ may be operated upon directly by the Enqueue Thread Dispatching Element (EQTDE), Dequeue Thread Dispatching Element (DQTDE), or Dispatch Thread Dispatching Queue (DTDQ) instructions. A TDQ may be implicitly accessed as the result of operations on Thread Send/Receive Counters or Thread Send/Receive Queues which reference the TDQ (i.e., the "associated" TDQ).

A TDQ is represented by a queue header to which TDEs are chained. The format of a TDQ header may be as follows:

| Descr. | // | Short Wait Ct. | 'Normal' TDE Queue | |
|---|---|---|---|---|

Bytes 0   2   4   8   11

| 'Empty' Event Queue | 'Resumption' Event Queue |
|---|---|

Bytes 12   16   19

| 'More Work' Event Queue | Parent TDQ address |
|---|---|

Bytes 20   24   31

A TDE is used to identify an executable piece of code and the attributes (e.g., priority, register contents) associated with it. TDEs may be explicitly created using the EQTDE (Enqueue Thread Dispatching Element) instruction or implicitly as the result of a send or receive type instruction. A TDE is used to store or load the current state at the time of a thread switch. The TDE for a particular thread can appear on a Thread Dispatching Queue (TDQ) or can be enqueued to an SRQ (Thread Send/Receive Queue) or SRC (Thread Send/Receive Counter) wait list. If a thread is eligible for instruction execution (thread dispatching), the associated TDE appears on a TDQ. If a program attempts to reference an invalid TDE (in a DQTDE (Dequeue Thread Dispatch Element) instruction), a specification exception occurs.

The format of the TDE may be as follows:

| Descr | S.F.V. | Pri. | Next TDE Pointer | //// |
|---|---|---|---|---|

Bytes 0   2   7   8   11   15

| Current Queue Pointer |
|---|

Bytes 16   23

| Thread Dispatching Element (TDE) | | |
|---|---|---|
| BYTEs | BITs | Description |
| 0–1 | | Descriptor: |
| | 0–3 | Version |
| | 4 | = 0 The Normal dispatching queue is empty (no TDEs) |
| | | = 1 The Normal dispatching queue has one or more TDEs enqueued |
| | 5 | = 0 The Empty Event queue is empty (no TDEs) |
| | | = 1 The Empty Event queue has one or more TDEs enqueued |
| | 6 | = 0 The Resumption Event queue is empty (no TDEs) |
| | | = 1 The Resumption Event queue has one or more TDEs enqueued |
| | 7 | = 0 The More Work Event queue is empty (no TDEs) |
| | | = 1 The More Work Event queue has one or more TDEs enqueued |
| | 8–15 | unused |
| 2–3 | | unused |
| 4–7 | | Short Waiters Count: The number of SRCs which have their short wait descriptor bit set and which currently have one or more waiting TDEs. Initial value is 0. |
| 8–11 | | Normal TDE Queue: Pointer to the first dispatchable TDE (Bit 4 of the descriptor = 1 if a TDE is enqueued). |
| 12–15 | | Empty Event TDE Queue: Pointer to the first event TDE (Bit 5 of the descriptor = 1 if a TDE is enqueued). |
| 16–19 | | Resumption Event TDE Queue: Pointer to the first event TDE (Bit 6 of the descriptor = 1 if a TDE is enqueued). |
| 20–23 | | More Work Event TDE Queue: Pointer to the first event TDE (Bit 7 of the descriptor = 1 if a TDE is enqueued). |
| 24–31 | | Parent TDQ address (optional): The TDQ which is to be dispatched if this TDQ runs out of work. |

| | | Thread Send/Receive Queue (SRQ) |
|---|---|---|
| BYTEs | BITs | Description |
| 0–1 | | Descriptor |
| | 0–3 | Version |
| | 4 | = 0 This is the last TDE on the chain |
| | | = 1 This is NOT the last TDE on the chain |
| | 5–6 | reserved = 00 |
| | 7 | Fixed/Removable TDE: |
| | | = 1 Fixed. This TDE is not removed from the event/normal queue when the specified event (below) occurs or the TDE is dispatched. |
| | | = 0 Removable. This TDE is removed from the event/normal queue when the specified event (below) occurs or the TDE is dispatched. |
| | 8–11 | Event Control: The event control bits are used by the EQTDE instruction when the TDE is being enqueued to a TDQ. All TDEs enqueued to an SRC or an SRQ must have event control specified as "normal" ( = 0000) or else a specification exception occurs. They control whether the TDE is placed on the normal queue or one of the seventy queues: |
| | | = 0000 Normal. The TDE is to be enqueued to the normal (dispatchable) TDE queue. These TDEs are ready to be dispatched. |
| | | = 0001 Empty event. This TDE is to be made dispatchable when the when there is an attempt to dispatch an empty TDQ (Normal queue is empty). |
| | | = 0011 Resumption event. This TDE is to be made dispatchable when the TDQ ('Normal' TDE queue) goes from empty to non-empty. |
| | | = 0110 More Work event. This TDE is to be made dispatchable when a TDE is added to the TDQ ('Normal' TDE queue). |
| | | TDEs are enqueued to the event queues in priority order. There may be many "removable" event TDEs for a given event condition, or one "fixed" TDE, but not both. When the specified event occurs the event TDE is "triggered". If it is a fixed TDE, the TDE content is copied and the copied TDE is placed on the normal (dispatchable) queue. If, however, it is a removable TDE, the TDE is moved to the normal (dispatchable) queue. Multiple TDEs may be placed on the dispatchable queue as part of a single operation. For example, if N TDEs are placed on the dispatchable queue, up to N event TDEs (fixed or removable) may also get placed on the dispatchable queue. (Note, for fixed events, copies of the events are created and placed upon the dispatchable queue.) The placement of event TDEs on the dispatchable queue do not themselves cause other events to be triggered. This is true for both fixed and removable events. All event TDEs are placed on the dispatchable queue BEFORE any of the triggering TDEs if they are of the same priority. The Resumption and More Work events are overlapping conditions. If there are event TDEs for both the resumption event is triggered. If only a More Work event is specified, then that is triggered when the normal queue goes from empty to non empty. When and event TDE is placed on the normal queue, the event control is set to normal ('0000'B). |
| | 12–15 | reserved = 0000 |
| 2–6 | | State Flags Vector - The saved state: (The PSW is always saved). |
| | 0 | = 1 GPRs |
| | 1 | = 1 Access Registers |
| | 2 | reserved (0) |
| | 3 | = 1 Floating Point Registers |
| | 4 | = 1 Vector Registers and Status Register |
| | 5 | = 1 Vector Mask Register |
| | 6–15 | reserved (0) |
| | 16–31 | = 1 CR0-CR16 (defined CRs only) |
| | 32–39 | reserved (0) |
| 7 | | TDE Priority: - 8-bit unsigned. |
| | | The priority assigned to a TDE when enqueued to a TDQ (the priority is ignored when a TDE is enqueued to an SRC or an SRQ - the priority is taken from the SRC or SRQ.) |
| | | The highest priority is zero. TDEs are enqueued in priority sequence, last within the same priority, when moved to the TDQ (all TDEs on an SRQ or SRC are of the same priority). |
| 8–11 | | Next TDE pointer (if any): If this is the last TDE on the chain, descriptor bit 4 = 0. |
| 16–23 | | Current queue pointer: Address of the TDQ to which this TDE is enqueued. |
| 24–31 | | reserved |
| 32–xx | | Save Area: (For items specified in the State Flags Vector - when presented on input (e.g., EQTDE) or output (e.g., MTTDE) the items specified in the State Flags Vector are in ADJACENT storage locations (no holes for unselected items). Thus, the offset to any specific set of items depends upon the prior items specified in the State Flags Vector): |

| Thread Send/Receive Queue (SRQ) | | |
|---|---|---|
| BYTEs | BITs | Description |
| | | 32–35 Instruction Address<br>GPR Contents - Regs 0 through 15.<br>Access Register Contents - Regs 0 through 15.<br>Floating Point Register Contents - Regs 0 through 4.<br>Vector and Status registers<br>Vector Mask Register<br>Control Registers |

An SRQ is an object used to exchange information between threads and to synchronize the transfer of control between threads. One thread can communicate with another thread by issuing a send type instruction to an SRQ or an SRC. Another thread can then obtain the information from the queue or counter by issuing a receive type instruction. These facilities are useful as a basis for many forms of efficient inter-thread communication and synchronization. Thread synchronization is provided by using Thread Send/Receive Messages and an SRQ in the following manner. When the active thread issues a Receive Message instruction and the target SRQ either (1) has no messages or (2) has no message which satisfies the search argument for the Receive Message instruction, the thread does not proceed. Instead, the thread is placed in the receive wait state by saving its state in a TDE and enqueuing it onto the wait list of the target SRQ. The thread dispatcher is then invoked to determine the next thread to be activated from the associated TDQ of the SRQ. The State Flags Vector of the SRQ defines the state to be saved whenever the TDE is put into wait on the SRQ. These flag values are copies to the TDE when the state is saved so that when the TDE is dispatched, the state which must be restored is known. Send and receive type operations are executed explicitly as instructions by threads and also be microcode functions. If a program attempts to reference an invalid SRQ, a specification exception occurs.

The format of the SRQ header my be as follows:

| Descr. | S.F.V. | Pri | Assoc. TDQ |
|---|---|---|---|

Bytes 0            2            7    8                              15

| Waiting TDEs | First Message Addr. |
|---|---|

Bytes 16                       20                              23

| Thread Send/Receive Message (SRM) | | |
|---|---|---|
| BYTEs | BITs | Description |
| 0–1 | | Descriptor |
| | 0–3 | Version |
| | 4 | = 0 The SRQ has no waiting TDEs.<br>= 1 The SRQ has one or more waiting TDEs. |
| | 5 | = 0 The SRQ has no SRMs (Thread Send/Receive Messages)<br>= 1 The SRQ has one or more SRMs |
| | 6 | reserved (0) |
| | 7 | Dispatch Control Option:<br>= 0 All TDEs are moved to the associated TDQ when the waiting TDEs are to be dispatched.<br>= 1 Only the first TDE is moved to the associated TDQ when the waiting TDEs are to be dispatched. |
| | 8–15 | Message Type: Specifies the type of register(s) from/to which the message Information is taken/placed (only the following values are valid):<br>= 00x No message information (only priority).<br>= 01x From/to a GPR.<br>= 02x From/to an even/odd GPR pair.<br>= 04x From/to an AR/GPR pair.<br>= 08x From/to an FPR. |
| 2–6 | | State Flags Vector - State to be saved. (The PSW is always saved.) |
| | 0 | = 1 Save the GPRS. |
| | 1 | = 1 Save the Access Registers |
| | 2 | = Reserved (0) |
| | 3 | = 1 Save the Floating Point Registers |
| | 4 | = 1 Save the Vector Registers and Status Register |
| | 5 | = 1 Save the Vector Mask Register |
| | 6–15 | Reserved (0) |
| | 16–31 | = 1 Save CR0-CR16 (defined CRs only) |
| | 32–39 | Reserved (0) |
| 7 | | TDE Priority: - 8-bit unsigned. The priority assigned to a TDE when enqueued to a TDQ (the priority is ignored when a TDE is enqueued to an SRC or an SRQ - the priority is taken from the SRC or SRQ.) The highest priority is zero. TDEs are enqueued in priority sequence,<br>last within the sane priority, when moved to the TDQ (all TDEs on an |

-continued

Thread Send/Receive Message (SRM)

| BYTEs | BITs | Description |
|---|---|---|
| 8–15 | | SRQ or SRC are of the same priority). Associated TDQ: The address of the TDQ where waiting TDEs are to be enqueued when they are to be moved to the TDQ. |
| 16–19 | | First waiting TDE Pointer: (If no TDEs are waiting, descriptor bit 4 = 0.) |
| 20–23 | | First Thread Send/Receive Message: (If no SRMs are enqueued, descriptor bit 5 = 0.) |

When a Send Message (SENDM) or Enqueue Message (EQM) instruction is executed, the information placed on the SRQ is referred to as a Thread Send/Receive Message (SRM). An SRM is not a separately created and addressable object like the others defined here. SRMs are dynamically "created" as a result of a SENDM or EQM and are "removed" from the SRQ when the information is retrieved using a Receiver Message (RECM) or Dequeue Message (DQM) instruction. The message information is extracted from the specified register or registers when the message is placed on an SRQ and placed in the specified register or registers when the message is retrieved from the SRQ. The register number or numbers are specified in the SENDM, EQM, RECM, or DQM instructions, but the register type (e.g., General Purpose Register (GPR), Access Register (AR), Floating Point Register (FPR)) is specified when the SRQ is created. In essence, this allows for register-to-register communications between threads. The SRM has a priority and contains a "message", which may often be a pointer to information in addressable storage.

The storage for SRMs can be dynamically allocated from object storage. The format of the SRM may be as follows:

| Descr. | //// | Pri | Next Msg Ptr. | Message |
|---|---|---|---|---|
| Bytes 0 | 2 | 7 | 8 | 12 xx |

Thread Send/Receive Counter (SRC)

| BYTEs | BITs | Description |
|---|---|---|
| 0–1 | | Descriptor |
| | 0–3 | Unused |
| | 4 | = 0 This is the last SRM on the chain<br>= 1 This is not the last SRM on the chain |
| | 5–15 | unused |
| 2–6 | | unused |
| 7 | | Message Priority - 8 bit unsigned. |
| 8–11 | | Next SRM Message Address (if any): (If no additional SRMs are enqueued, descriptor bit 4 = 0.) |
| 12–xx | | Message: The required size of the message area is determined by the size of the registers being copied here. |

An SRC is a thread object used in much the same way as an SRQ except that no messages are enqueued. Instead, a Send Count (SENDC) instruction causes the count field in the SRC header to be incremented. A Receive Count (RECC) instruction may cause the count to be decremented. The State Flags Vector of the SRC defines the state to be saved whenever a TDE is put into wait on the SRC. These flag values are copies to the TDE when the state is saved so that when the TDE is dispatched, the state which must be restored is known. If the program attempts to reference an invalid SRC, a specification exception occurs.

The format of the SRC may be as follows:

| Descr. | S.F.V. | Pri | Assoc. TDQ Ptr. | Limit | Count |
|---|---|---|---|---|---|
| Bytes 0 | 2 | 7 | 8 | 16 | 20  23 |

| Waiters | Owner |
|---|---|
| Bytes 24 | 28   31 |

Storage Allocation and Addressing

| BYTEs | BITs | Description |
|---|---|---|
| 0–1 | | Descriptor |
| | 0–3 | Version |
| | 4 | = 0 The SRC has no waiting TDEs. |
| | | = 1 The SRC has one or more waiting TDEs. |
| | 5 | unused |
| | 6 | = 0 The SRC has no "owner" (is not locked). |
| | | = 1 The SRC has an "owner". |
| | 7 | Dispatch Control Option: |
| | | = 0 All TDEs are moved to the associated TDQ when the waiting TDEs are to be dispatched. |
| | | = 1 Only the first TDE is moved to the associated TDQ when the waiting Toes are to be dispatched. |
| | 8 | Short Wait Option: Certain high-level synchronizing constructs such as barriers, DOACROSS, etc. may cause threads to wait for very short periods. This bit allows the machine to know when such situations may occur and to possibly optimize their operation. |
| | | = 0 Normal mode - TDEs in wait on this SRC may be in wait for a long period. |
| | | = 1 TDEs in wait on this SRC are expected to be in wait for only a very short period before the wait will be satisfied. |
| | 9–15 | Reserved (0) |
| 2–6 | | State Flags Vector - State to be saved. (The PSW is always saved.) |
| | 0 | = 1 Save the GPRs. |
| | 1 | = 1 Save the Access Registers |
| | 2 | Reserved (0) |
| | 3 | = 1 Save the Floating Point Registers |
| | 4 | = 1 Save the Vector Registers and Status Register |
| | 5 | = 1 Save the Vector Mask Register |
| | 6–15 | Reserved (0) |
| | 16–31 | = 1 Save CR0-CR16 (defined CRs only) |
| | 32–39 | Reserved (0) |
| 7 | | TDE Priority: - 8 bit unsigned. The priority assigned to a TDE when enqueued to a TDQ (the priority is ignored when a TDE is enqueued to an SRC or an SRQ - the priority is taken from the SRC or SRQ.) The highest priority is zero. TDEs are enqueued in priority sequence, last within the same priority, when moved to the TDQ (all TDEs on an SRQ or SRC are of the same priority). |
| 8–15 | | Associated TDQ - The address of the TDQ where waiting TDEs are to be enqueued when they are to be moved to the TDQ. |
| 16–19 | | Limit Value - 32-bit integer. |
| 20–23 | | Count Value - 32-bit integer. |
| 24–27 | | First waiting TDE Pointer: (If no TDEs are waiting, descriptor bit 4 = 0.) |
| 28–31 | | Owner: (Bit 6 = 0 if not owned - unlocked.) When an SRC is "locked" by a RECC instruction, it may place a value in this field. When it is "unlocked" by a SENDC instruction, bit 6 of the descriptor is set to 0 indicating that it is unlocked. This may be used for debugging deadlock situations. |

The objects defined above are unique in that when they are created using the defined create instructions, they are "encapsulated" by the machine. When an object is created, the create instruction returns "an address" into the "object space" which can be used by the instructions defined below to reference the object. Objects do not "reside" in regularly addressable memory and cannot be referenced using regular instructions with references to memory.

The address returned has the following architectural properties:

i. It is "associated" with the address space which would have been referenced had the address been used to reference memory. In a distributed system, a node reference would be included with the address space identity. One can therefore talk of the objects associated with an address space. The PURGE instruction can be used to destroy all objects associated with an address space.

ii. The associated address space must exist and be authorized to the issuer of the instruction or else an object reference causes an addressing exception.

iii. If control registers (CRs), access registers (ARs) or other mechanisms are used to control the address spaces which may be referenced, they likewise control accessibility to objects associated with an address space. For example, with access registers, the user must set the content of the access register to control the address space with which a created object will be associated.

iv. Just as the user can "construct" memory addresses, the user can construct object addresses, but these can only be used to reference valid (created) objects associated with an address space to which the user has access.

v. If an address is used to reference an invalid object (destroyed or not yet created), a specification exception occurs.

vi. Address values may be reused. That is, if an address is returned on a create, then following a destroy, the same address value may be reused.

vii. The actual number of objects which can exist at any given time is model dependent and may be extracted from the machine using a diagnostic function.

This approach provides object integrity by preventing inappropriate access and yet, potentially, very fast access to system controlled storage. Because the user does not see the actual mechanisms used to represent the object, the implementation may be changed without affecting the user. Even synchronization among threads in loosely coupled systems may be supported with this interface if the implementation mechanisms are provided.

Thread Dispatching

The dispatching of threads is handled by a machine function known as the thread dispatcher. The thread dispatcher is invoked implicitly by the send/receive type instructions and explicitly by the Dispatch Thread Dispatching Queue instruction. It is the responsibility of the thread dispatcher to determine which thread should be dispatched next and to accomplish the thread switch. The status of the new thread is taken from the next thread's TDE.

The primary object associated with the thread dispatching function is the TDQ. TDEs which are available to be dispatched are placed on a TDQ and are usually dequeued (i.e., the TDE storage is freed) by the thread dispatcher when they are dispatched. However, if the "Fixed" option of the TDE is on, the TDE is not removed after dispatching.

The thread dispatcher is invoked when any of the following conditions occur:

i. A send operation (message or count) occurs and there are TDEs on the TDQ of a higher priority than those placed on the TDQ by the send operation. These higher priority TDEs may be due to "more work" or "resumption" event TDEs. In this case, the state of the currently running thread is saved in a TDE which is placed on the TDQ at the same priority as those from the SRQ or SRC.

ii. A receive operation (message or count) occurs and the receive is not satisfied. In this case, the current state is saved in a TDE which is placed on the SRC or SRQ wait list by the receive operation.

iii. The thread dispatcher is explicitly invoked with the Dispatch Thread Dispatching Queue (DTDQ) instruction.

In all three cases, the top TDE on the TDQ will be dispatched. For the second and third cases, the TDQ may be empty. If the TDQ is empty, the following happens:

i. If the TDQ has any short wait SRCs, then the processor waits for the short wait to be satisfied or until the timeout occurs.

ii. If there are no short wait SRCs or the timeouts elapse, the "empty TDQ" event TDE, if any, is dispatched.

iii. If there is no "empty TDQ" event TDE and there is a parent TDQ, then the parent TDQ is dispatched.

iv. If there is no "empty TDQ" event TDE and no parent TDQ, a TDQ Empty Exception (program) is signaled.

The second situation means that the thread dispatcher has run out of work. The programming system should place an "empty TDQ" event TDE on the TDQ to handle this situation. It will thus be dispatched when there are no more TDEs to be dispatched. This TDE can be used to define whatever actions the programming system wishes, including the use of system services to place the system dispatchable unit (MVS task, VM virtual processor, etc.) into a system wait. This TDE may be a fixed TDE if multiple tasks will attempt to access the TDQ. Other events may be defined to help manage the dynamic work load. Thread dispatching can only occur among threads which are logically executing one of the threading instructions. This is unlike system dispatching and can occur at any arbitrary point in a program's execution.

Threading Instructions

All the instructions are architected as non-interruptable, since it is an objective of the invention to provide high performance access to these objects. Although it is logically feasible to interrupt operations which are in progress and block the initiation of other operations, the preferred implementation of the invention does not do this since it might cause the queue to be inaccessible by other threads for an indeterminate period. In other words, other threads should never see an SRQ or SRC as "busy" or inaccessible; however, processors in a multi-processor system may find objects inaccessible for short period of time.

On a system with multiple processors, instruction execution must architecturally give the appearance that only one processor at a time is operating on an object, or group of objects, involved in the operation (i.e., object and instruction atomicity). This does not prevent the implementation from overlapping operations on objects so long as the appearance of atomicity is maintained. Some operations may require access to more than one object (e.g., moving TDEs from an SRQ to the associated TDQ). The implementation must ensure the consistency of all the objects involved and also that deadlocks do not occur. The architecture is defined such that deadlock-free operation can be guaranteed and the implementation can use a simple locking hierarchy.

The threading instructions are as follows:

Create Thread Send/Receive Counter (CRSRC)—This instruction creates a Thread Send/Receive Counter (SRC), and its token is returned in the register designated by the first operand. The second operand contains the address of a location in storage which defines the SRC to be created. The limit value of the counter is set to the value specified by the limit specification. This value is treated as an unsigned binary integer. If no SRCs are allocated, a program check exception occurs.

Format: RRE

CRSRC SRC_address,SRC_Specification
CRSRC R1,R2

| B301 | //////// | R1 | R2 |
|---|---|---|---|
| 16 | 24 | 28 | 31 |

Operation: An SRC is created and its token is returned in the register designated by operand 1. The second operand must contain the address of a location in storage which defines the SRC to be created:

| BYTEs | BITs | Description |
|---|---|---|
| 0–1 | | Descriptor |
| | 0–3 | Version (only '0001"B allowed) |
| | 4–6 | Reserved = 000 |
| | 7 | Dispatch Control Option: = 0 All TDEs are moved to the associated TDQ when the waiting TDEs are to be dispatched. |

-continued

| BYTEs | BITs | Description |
|---|---|---|
| | | = 1 Only the first TDE is moved to the associated TDQ when the waiting TDEs are to be dispatched. |
| | 8 | Short Wait Option: Certain high-level synchronizing constructs such as barriers, DOACROSS, etc. may cause threads to wait for very short periods. This bit allows the machine to know when such situations may occur and to possibly optimize their operation.<br>= 0 Normal mode - TDEs in wait on this SRC may be in wait for a long period.<br>= 1 TDEs in wait on this SRC are expected to be in wait for only a very short period before the wait will be satisfied. |
| | 9–15 | Reserved (0) |
| 2–6 | | State Flags Vector - State to be saved. (The PSW is always saved.) |
| | 0 | = 1 Save the GPRs. |
| | 1 | = 1 Save the Access Registers |
| | 2 | Reseraed (0) |
| | 3 | = 1 Save the Floating Point Registers |
| | 4 | = 1 Save the Vector Registers and Status Register |
| | 5 | = 1 Save the Vector Mask Register |
| | 6–15 | Reserved (0) |
| | 16–31 | = 1 Save CR0-CR16 (defined CRs only) |
| | 32–39 | Reserved (0) |
| 7 | | TDE Priority: - 8-bit unsigned. The priority assigned to a TDE when enqueued to a TDQ (the priority is ignored when a TDE is enqueued to an SRC or an SRQ - the priority is taken from the SRC or SRQ.) The highest priority is zero. TDEs are enqueued in priority sequence, last within the same priority, when moved to the TDQ (all TDEs on an SRQ or SRC are of the same priority). |
| 8–15 | | Associated TDQ - The address of the TDQ where waiting TDEs are to be enqueued when they are to be moved to the TDQ. |
| 16–19 | | Limit Value - 32-bit integer. |

The limit value of the counter is set to the value specified by the limit specification. This value is treated as an unsigned binary integer. The initial count value is set to zero. The count is treated as an unsigned binary 32 bit integer. The long/short wait option specification may be used by the implementation to optimize its operation. If no SRCs can be allocated, a Program Check exception occurs.

Condition Code: Unchanged.
Boundary Requirements: None.
Program Exceptions:
Addressing (no SRCs available, no associated address space)
Specification (invalid associated TDQ specified, invalid version number, invalid State Flags Vector).

Cream Thread Send/Receive Queue(CRSRQ)—This instruction creates an SRQ, and its address is returned in the register designated by the first operand. The second operand contains the address of a location in storage which defines the SRQ to be created. If no SRQs can be allocated, a program check exception occurs.

Format: RRE

CRSRQ SRQ_address,SRQ_Specification
CRSRQ R1,R2

| B302 | //////// | R1 | R2 |
|---|---|---|---|
| 16 | | 24 | 28  31 |

Operation: An SRQ is created and its token is returned in the register designated by operand 1. The second operand must contain the address of a location in storage which defines the SRQ to be created:

| BYTEs | BITs | Description |
|---|---|---|
| 0–1 | | Descriptor |
| | 0–3 | Version Number (only '0001'B allowed) |
| | 4–6 | Reserved (0) |
| | 7 | Dispatch Control Option:<br>= 0 All TDEs are moved to the associated TDQ when the waiting TDEs are to be dispatched.<br>= 1 Only the first TDE is moved to the associated TDQ when the waiting Toes are to be dispatched. |
| | 8–15 | Message Type: Specifies the type of register(s) from/to which the message information is taken/placed (only the following values are valid):<br>= 00x No message information (only priority).<br>= 01x From/to a GPR.<br>= 02x From/to an even/odd GPR pair.<br>= 04x From/to an AR/GPR pair.<br>= 08x From/to an FPR. |

-continued

| BYTEs | BITs | Description |
|---|---|---|
| 2–6 | | State Flags Vector - State to be saved. (The PSW is always saved.) |
| | 0 | = 1 Save the GPRS. |
| | 1 | = 1 Save the Access Registers |
| | 2 | Reserved (0) |
| | 3 | = 1 Save the Floating Point Registers |
| | 4 | = 1 Save the Vector Registers and Status Register |
| | 5 | = 1 Save the Vector Mask Register |
| | 6–15 | Reserved (0) |
| | 16–31 | = 1 Save CR0-CR16 (defined CRs only) |
| | 32–39 | Reserved (0) |
| 7 | | TDE Priority: - 8-bit unsigned. The priority assigned to a TDE when enqueued to a TDQ (the priority is ignored when a TDE is enqueued to an SRC or an SRQ - the priority is taken from the SRC or SRQ.) The highest priority is zero. TDEs are enqueued in priority sequence, last within the same priority, when moved to the TDQ (all TDEs on an SRQ or SRC are of the same priority). |
| 8–15 | | Associated TDQ: The address of the TDQ where waiting TDEs are to be enqueued when they are to be moved to the TDQ. |

If no SRQs can be allocated, a Program Check exception occurs.
Condition Code: Unchanged.
Boundary Requirements: None.
Program exceptions:
Addressing (no SRQs available, no associated address space)
Specification (invalid associated TDQ specified, invalid version number, invalid State Hags Vector, Message Type (invalid message type, even register not specified for even/odd pair, invalid register number))

Create Thread Dispatching Queue(CRTDQ)—This instruction creates a TDQ, and its token is returned in the register designated by the first operand. The second operand contains the address of a location in storage which defines the TDQ to be created.

Format: RRE

CRTDQ TDQ_address,TDQ_Specification
    CRTDQ R1,R2

| B303 | //////// | R1 | R2 |
|---|---|---|---|
| 16 | | 24 | 28 31 |

Operation: A TDQ is created and its token is returned in the register designated by operand 1. The second operand must contain the address of a location in storage which defines the TDQ to be created:

| BYTEs | BITs | Description |
|---|---|---|
| 0–1 | | Descriptor |
| | 0–3 | Version (only '0001'B allowed) |
| | 4–15 | unused |

Condition Code: Unchanged.
Boundary Requirements: None.
Program Exceptions:
Addressing (no TDQs available, no associated address space)
Specification (invalid version number)

Dequeue Message (DQM)—This instruction dequeues an SRM (Thread Send/Receive Message) from the designated SRQ (Thread Send/Receive Queue). In operation, the SRMs on the SRQ are searched sequentially, starting with the first SRM, and the first SRM satisfying the search type is dequeued.

Format: RRE

DQM Search_type,Priority,Message,SRQ_address
    DQM I3,R4,R1,R2

| B331 | I3 | R4 | R1 | R2 |
|---|---|---|---|---|
| 16 | 20 | 24 | 28 | 31 |

Operation: The SRMs on the SRQ designated by the token in R2 are searched sequentially, starting with the first SRM. The search is controlled by the Priority designated by bits 24–31 of R4. The first SRM satisfying the Search type, designated by I3, is dequeued. The message is placed in the register designated by R1 and the actual priority of the message is placed in bits 24–31 of R4. The type of register (GPR, FPR, etc.) designated by R1 is determined from the Message Type of the SRQ. The meaning of the Search_Type is:

| BITs | Description |
|---|---|
| 0 | Message Priority = Search_Priority |
| 1 | Message Priority < Search_Priority |
| 2 | Message Priority > Search_Priority |

The Search_Type is the logical inclusive OR of the designated bits. For a Search Type of binary 000x, no priority will satisfy the search type, therefore, this combination is invalid. A specification exception occurs. For a Search_Type of binary 111x, the first message is dequeued. If no message satisfies the Search_Type, or if the message list is empty, R 1 (the message) and R4 (the priority of the message) are not altered. No thread dispatching is involved in a DQM.

| Condition Code: | |
|---|---|
| 0 | One or more messages remain after a successful dequeue |
| 1 | No messages remain after a successful dequeue |
| 3 | No message dequeued |

Boundary Requirements: None.
Program Exceptions:
Addressing (no associated address space)
Specification (invalid SRQ address, invalid Search_Type)

Dequeue Thread Dispatching Element (DQTDE)—This instruction dequeues the designated TDE. Upon dequeue, the TDE is no longer a valid TDE.

Format: RRE

```
DQTDE TDE_address,Q_address
DQTDE R1,R2
```

| B333 | // | // | R1 | R2 |
|------|----|----|----|----|
| 16   | 20 | 24 | 28 | 31 |

Operation: No Search Priority is used. The TDE designated by the token in R1 is dequeued from the SRQ (Thread Send/Receive Queue) wait list, SRC (Thread Send/Receive Counter) wait list, or TDQ (Thread Dispatching Queue) designated by the token in R2. Upon dequeue, the TDE is no longer a valid TDE. No thread dispatching is involved in a DQTDE.

| Condition Code: | |
|---|---|
| 0 | One or TDEs remain after a successful dequeue. |
| 1 | No TDEs remain after a successful dequeue. |
| 3 | No TDE dequeued (invalid TDE address). |

Boundary Requirements: None.
Program Exceptions:
Addressing (no associated address space)
Specification (invalid SRQ, SRC or TDQ address)

Destroy Thread Send/Receive Counter (DSSRC)—This instruction destroys or makes unavailable the Thread Send/Receive Counter (SRC) designated by the first operand.

Format: RRE

```
DSSRC SRC_address
DSSRC R1
```

| B311 | /////// | R1 | // |
|------|---------|----|----|
| 16   | 24      | 28 | 31 |

Operation: The Thread Send/receive Counter designated by the first operand is made unavailable. If the first operand does not specify a valid SRC a specification exception occurs. Subsequent attempts to reference a destroyed SRC will result in a specification exception.
Condition Code: Unchanged.
Boundary Requirements: None.
Program Exceptions:
Addressing (no associated address space)
Specification (invalid SRC address)

Destroy Thread Send/Receive Queue (DSSRQ)—This instruction destroys or makes unavailable the designated Thread Send/Receive Queue (SRQ).

Format: RRE

```
DSSRQ SRQ_address
DSSRQ R1
```

| B312 | /////// | R1 | // |
|------|---------|----|----|
| 16   | 24      | 28 | 31 |

Operation: The Thread Send/Receive Queue designated by the first operand is made unavailable. If the first operand does not specify a valid SRQ a specification exception occurs. Subsequent attempts to reference a destroyed SRQ will result in a specification exception.
Condition Code: Unchanged
Boundary Requirement: None Program exceptions:
Addressing (no associated address space)
Specification (invalid-SRQ address)

Destroy Thread Dispatching Queue (DSTDQ)— This instruction destroys or makes unavailable the designated Thread Dispatching Queue (TDQ).

Format: RRE

```
DSTDQ TDQ_address
DSTDQ R1
```

| B313 | /////// | R1 | // |
|------|---------|----|----|
| 16   | 24      | 28 | 31 |

Operation: The Thread Dispatching Queue designated by the first operand is made unavailable. If the first operand does not specify a valid TDQ a specification exception occurs. Subsequent attempts to reference a destroyed TDQ will result in a specification exception.
Condition Code: Unchanged.
Boundary Requirements: None.
Program Exceptions:
Addressing (no associated address space)
Specification (invalid TDQ address)

Dispatch Thread Dispatching Queue (DTDQ)—This instruction locates the first operand designated by the TDQ (Thread Dispatching Queue), and the thread dispatcher is invoked. The current state is not saved in a TDE. Thus, this instruction defines the logical end of a thread. Like an unconditional branch, this instruction causes an unconditional transfer of control, and the next sequential instruction (NSI) is never executed.

Format: RRE

```
DTDQ TDQ_address
DTDQ R1
```

| B340 | /////// | R1 | // |
|------|---------|----|----|
| 16   | 24      | 28 | 31 |

Operation: The TDQ (Thread Dispatching Queue) designated by the first operand is located and the thread dispatcher is invoked. The current state is not saved in a TDE, thus this instruction defines the logical end of a thread. Like an unconditional branch, this instruction causes an unconditional transfer of control and the next sequential instruction is never executed.
Condition Code: Unchanged.
Boundary Requirements: None.
Program Exceptions:
Addressing (no associated address space)
TDQ Empty
Specification (invalid TDQ)

Enqueue Message (EQM)—This instruction causes the message list of the SRQ (Thread Send/Receive Queue) to be searched, in sequence beginning with the first message. The Thread Send/Receive Message is enqueued to the message list of the designated Thread Send/Receive Queue with a designated priority.

Format: RRE

```
EQM Enqueue_type,Priority,Message,SRQ_address
EQM I3,R4,R1,R2
```

-continued

| B332 | I3 | R4 | R1 | R2 |
|------|----|----|----|----|
| 16   | 20 | 24 | 28 | 31 |

Operation: The message list of the SRQ designated by R2 is searched, in sequence, beginning with the first message. The message, contained in the register designated by R1, is enqueued First/Last, as designated by the value of I3 (00x= First, 01x= Last), within priority order. The priority of the message is specified by bits 24–31 of R4. The type of the register (GPR, FPR, etc.) designated by R1 is determined from the Message Type field of the SRQ. If there are no messages of the same priority, the new message is enqueued before the first message with a larger priority value, or last if there is none. The priority is treated as an unsigned binary value.
  Condition Code: Unchanged
  Boundary Requirements: None
  Program Exceptions:
  Addressing (no associated address space, no message space available)
  Specification (invalid Enqueue type or SRQ address)

Enqueue Thread Dispatching Element (EQTDE)—This instruction defines a TDE (Thread Dispatching Element), and the TDE is enqueued to the specified TDQ (Thread Dispatching Queue) wait list.

Format: RS

EQTDE TDE_address,Q_address,TDE_specification
  EQTDE R1,R3,D2(B2)

| 85 | R1 | R3 | B2 | D2 |
|----|----|----|----|----|
| 8  | 12 | 16 | 20 | 31 |

Operation: A TDE (Thread Dispatching Element) defined by the TDE specification is enqueued to the specified TDQ (Thread Dispatching Queue) wait list designated by R3. Enqueuing is in priority sequence; low priority first, last within priority value. If the TDE is a fixed TDE, the address of the enqueued TDE is returned in the register specified by R1. The TDE_specification, in the storage location designated by D2(B2), is used to control the content of the TDE:

| BYTEs | BITs | Description |
|-------|------|-------------|
| 0–1   |      | Descriptor |
|       | 0–3  | Version (only '0001'B allowed) |
|       | 4    | Ignored |
|       | 5–6  | Reserved = 00 |
|       | 7    | Fixed/Removable TDE<br>= 1 Fixed. This TDE is not removed from the event/normal queue when the specified event (below) occurs or the TDE is dispatched.<br>= 0 Removable. This TDE is removed from the event/normal queue when the specified event (below) occurs or the TDE is dispatched. |
|       | 8–11 | Event Control: The event control bits are used by the EQTDE instruction when the TDE is being enqueued to a TDQ. All TDEs enqueued to an SRC or an SRQ must have event control specified as "normal" (= 0000) or else a specification exception occurs. They control whether the TDE is placed on the normal queue or one of the "event" queues:<br>= 0000 Normal. The TDE is to be enqueued to the normal (dispatchable) TDE queue. These TDEs are ready to be dispatched.<br>= 0001 Empty event. This TDE is to be made dispatchable when there is an attempt to dispatch and empty TDQ ('Normal' TDE queue is empty).<br>= 0011 Resumption event. This TDE is to be made dispatchable when the TDQ ('Normal' TDE queue) goes from empty to non-empty.<br>= 0110 More Work event. This TDE is to be made dispatchable when a TDE is added to the TDQ ('Normal' TDE queue).<br>TDEs are enqueued to the event queues in priority order. There may be many "removable" event TDEs for a given event condition, or one "fixed" TDE, but not both. When the specified event occurs the event TDE is "triggered". If it is a fixed TDE, the TDE content is copied and the copied TDE is placed on the normal (dispatchable) queue. If, however, it is a removable TDE, the TDE is moved to the normal (dispatchable) queue. Multiple TDEs may be placed on the dispatchable queue as part of a single operation. For example, if N TDEs are placed on the dispatchable queue, up to N event TDEs (fixed or removable) may also get placed on the dispatchable queue. (vote, for fixed events, copies of the events are created and placed upon the dispatchable queue.) The placement of event TDEs on the dispatchable queue do not themselves cause other events to be triggered. This is true for both fixed and removable events. All event TDEs are placed on the dispatchable queue BEFORE any of the triggering TDEs if they are of the same priority. The Resumption and More Work events are overlapping conditions. If there are event TDEs for both, the resumption event is triggered. If only a More Work event is specified, then that is triggered when the normal queue goes from empty to non empty. When and event TDE is placed on the normal queue, the event control is set to normal ('0000'B). |
|       | 12–15 | Reserved = 0000 |
| 2–6   |      | State Flags Vector - The state (below) to be placed in the TDE. (The PSW is always saved). |
|       | 0    | = 1 GPRs |
|       | 1    | = 1 Access Registers |

| BYTEs | BITs | Description |
|---|---|---|
| | 2 | Reserved (0) |
| | 3 | = 1 Floating Point Registers |
| | 4 | = 1 Vector Registers and Status Register |
| | 5 | = 1 Vector Mask Register |
| | 6–39 | Reserved |
| 7 | | TDE Priority: –8-bit unsigned. The priority assigned to a TDE when enqueued to a TDQ (the priority is ignored when a TDE is enqueued to an SRC or an SRQ - the priority is taken from the SRC or SRQ.) The highest priority is zero. TDEs are enqueued in priority sequence, last within the same priority, when moved to the TDQ (all TDEs on an SRQ or SRC are of the same priority). |
| 8–23 | | Reserved |
| 24–31 | | Reserved |
| 32–xx | | Save Area: (For items specified in the State Flags Vector - when presented on input (e.g., EQTDE) or output (e.g., MTTDE) the items specified in the State Flags Vector are in ADJACENT storage locations (no holes for unselected items). Thus, the offset to any specific set of items depends upon the prior items specified in the State Flags Vector): <br>• 32–35 Instruction Address <br>• GPR Contents - Regs 0 through 15. <br>• Access Register Contents - Regs 0 through 15. <br>• Floating Point Register Contents - Regs 0 through 4. |

No thread dispatching occurs.
Condition Code: Unchanged
Boundary Requirements: None
Program Exceptions:
Addressing (No associated address space, no TDE space available.)
Specification (1st and 3rd operands: invalid TDE, TDQ, SRQ or SRC address; second operand: Fixed event specified and events are already defined, Removable event specified and a fixed event is already defined, invalid Version, invalid State Flags Vector, invalid Event Control value)
Materialize Thread Send/Receive Counter (MTSRC)—
This instruction presents the characteristics and contents of the Thread Send/Receive Counter (SRC) in addressable storage.

Format: RRE

MTSRC Storage_length,Object_address,Storage_address
MTSRC L3,R1,R2

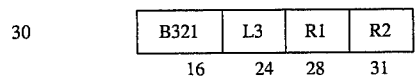

Operation: The contents and characteristics of the Thread Send/Receive Counter designated by R1 are displayed in the storage location designated by R2 and L3 (starting at the address specified in R2 up to the length specified by L3). L3 is treated as an unsigned binary value. If the number of bytes specified by L3 is inadequate, the operation Simply terminates after L3 bytes have been materialized, and the condition code is set accordingly. The format of the displayed Information is:

| BYTEs | BITs | Description |
|---|---|---|
| 0–1 | | Descriptor |
| | 0–3 | Version |
| | 4 | = 0 The SRC has no waiting TDEs. <br> = 1 The SRC has one or more waiting TDEs. |
| | 5 | unused |
| | 6 | = 0 The SRC has no "owner" (is not locked). <br> = 1 The SRC has an "owner". |
| | 7 | Dispatch Control Option: <br> = 0 All TDEs are moved to the associated TDQ when the waiting TDEs are to be dispatched. <br> = 1 Only the first TDE is moved to the associated TDQ when the waiting TDEs are to be dispatched. |
| | 8 | Short Wait Option: Certain high-level synchronizing constructs such as barriers, DOACROSS, etc. may cause threads to wait for very short periods. This bit allows the machine to know when such situations may occur and to possibly optimize their operation. <br> = 0 Normal mode - TDEs in wait on this SRC may be in wait for a long period. <br> = 1 TDEs in wait on this SRC are expected to be in wait for only a very short period before the wait will be satisfied. |
| | 9–15 | Reserved (0) |
| 2–6 | | State Flags Vector - State to be saved. (The PSW is always saved.) |
| | 0 | = 1 Save the GPRs |
| | 1 | = 1 Save the Access Registers |
| | 2 | Reserved (0) |
| | 3 | = 1 Save the Floating Point Registers |

-continued

| BYTEs | BITs | Description |
|---|---|---|
| | 4 | = 1 Save the Vector Registers and Status Register |
| | 5 | = 1 Save the Vector Mask Register |
| | 6–15 | Reserved (0) |
| | 16–31 | = 1 Save CR0-CR16 (defined CRs only) |
| | 32–39 | Reserved (0) |
| 7 | | DE Priority: –8-bit unsigned. The priority assigned to a TDE when enqueued to a TDQ (the priority is ignored when a TDE is enqueued to an SRC or an SRQ - the priority is taken from the SRC or SRQ.) The highest priority is zero. TDEs are enqueued in priority sequence, last within the same priority, when moved to the TDQ (all TDEs on an SRQ or SRC are of the same priority). |
| 8–15 | | Associated TDQ - The address of the TDQ where waiting TDEs are to be enqueued when they are to be moved to the TDQ. |
| 16–19 | | Limit Value - 32-bit integer. |
| 20–23 | | Count Value - 32-bit integer. |
| 24–27 | | First waiting TDE Pointer (If no TDEs are waiting, descriptor bit 4 = 0.) |
| 28–31 | | Owner: (Bit 6 = 0 if not owned - unlocked.) When an SRC is "locked" by a RECC instruction, it may place a value in this field. When it is "unlocked" by a SENDC instruction, bit 6 of the descriptor is set to 0 indicating that it is unlocked. This may be used for debugging deadlock situations. |

Condition Code:

| | |
|---|---|
| 0 | Object successfully materialized. |
| 1 | Length specified by L3 was inadequate. |
| 3 | Invalid SRC address. |

Boundary Requirements: None.
Program Exceptions:
Addressing (no associated address space)
Materialize Thread Send/Receive Queue (MTSRQ)—This instruction presents the characteristics and contents of the Thread Send/Receive Queue (SRQ) in addressable storage.

Format: RRE

MTSRQ Storage_length,Object_address,Storage_address
    MTSRQ L3,R1,R2

-continued

| B322 | L3 | R1 | R2 |
|---|---|---|---|
| 16 | 24 | 28 | 31 |

Operation: The contents and characteristics of the Thread Send/Receive Queue designated by R1 are displayed in the storage location designated by R2 and L3 (starting at the address specified in R2 up to the length specified by L3). L3 is treated as an unsigned binary value. If the number of bytes specified by L3 is inadequate, the operation simply terminates after L3 bytes have been materialized, and the condition code is set accordingly. The format of the displayed Information is:

| BYTEs | BITs | Description |
|---|---|---|
| 0–1 | | Descriptor |
| | 0–3 | Version Number |
| | 4 | = 0 The SRQ has no waiting TDEs. |
| | | = 1 The SRQ has one or more waiting TDEs. |
| | 5 | = 0 The SRQ has no SRMs (Thread Send/Receive Messages) |
| | | = 1 The SRQ has one or more SRMs |
| | 6 | Reserved (0) |
| | 7 | Dispatch Control Option: |
| | | = 0 All TDEs are moved to the associated TDQ when the waiting TDEs are to be dispatched. |
| | | = 1 Only the first TDE is moved to the associated TDQ when the waiting TDEs are to be dispatched. |
| | 8–15 | Message Type: Specifies the type of register(s) from/to which the message information is taken/placed (only the following values are valid): |
| | | = 00x No message information (only priority). |
| | | = 01x From/to a GPR. |
| | | = 02x From/to an even/odd GPR pair. |
| | | = 04x From/to an AR/GPR pair. |
| | | = 08x From/to an FPR. |
| 2–6 | | State Flags Vector - State to be saved. (The PSW is always saved.) |
| | 0 | = 1 Save the GPRs |
| | 1 | = 1 Save the Access Registers |
| | 2 | Reserved (0) |
| | 3 | = 1 Save the Floating Point Registers |

-continued

| BYTEs | BITs | Description |
|---|---|---|
| | 4 | = 1 Save the Vector Registers and Status Register |
| | 5 | = 1 Save the Vector Mask Register |
| | 6–15 | Reserved (0) |
| | 16–31 | = 1 Save CR0–CR16 (defined CRs only) |
| | 32–39 | Reserved (0) |
| 7 | | TDE Priority: –8-bit unsigned. The priority assigned to a TDE when enqueued to a TDQ (the priority is ignored when a TDE is enqueued to an SRC or an SRQ - the priority is taken from the SRC or SRQ.) The highest priority is zero. TDEs are enqueued in priority sequence, last within the same priority, when moved to the TDQ (all TDEs on an SRQ or SRC are of the same priority). |
| 8–15 | | Associated TDQ: The address of the TDQ where waiting TDEs are to be enqueued when they are to be moved to the TDQ. |
| 16–19 | | First waiting TDE Pointer.- (If no TDEs are waiting, descriptor bit 4 = 0.) |
| 20–23 | | Message Count: - Fixed binary. |
| 24–27 | | Message Length: - Fixed binary. The length of each of the following messages. |

The messages are displayed in priority order. For each SRM on the SRQ:

| BYTEs | BITs | Description |
|---|---|---|
| 0–6 | | Unused |
| 7 | | Priority - 8-bit unsigned. |
| 8–xx | | Message: Generally a pointer to a message in addressable storage. |

Condition Code:

| | |
|---|---|
| 0 | Object successfully materialized. |
| 1 | Length specified by L3 was inadequate. |
| 3 | Invalid SRQ address. |

Boundary Requirements: None.
Program Exceptions
Addressing (no associated address space)

Materialize Thread Dispatching Element (MTTDE)—This instruction presents the characteristics and contents of the Thread Dispatching Element (TDE) in addressable storage.

Format: RRE

MTTDE Storage_length,Object_address,Storage_address
MTTDE L3,R1,R2

| B324 | L3 | R1 | R2 |
|---|---|---|---|
| 16 | 24 | 28 | 31 |

Operation: The contents and characteristics of the Thread Dispatching Element designated by R1 are displayed in the storage location designated by R2 and L3 (starting at the address specified in R2 up to the length specified by L3). L3 is treated as an unsigned binary value. If the number of bytes specified by L3 is inadequate, the operation simply terminates after L3 bytes have been materialized, and the condition code is set accordingly.

The format of the displayed information is:

| BYTEs | BITs | Description |
|---|---|---|
| 0–1 | | Descriptor |
| | 0–3 | Version |
| | 4 | = 0 This is the last TDE on the chain<br>= 1 This is NOT the last TDE on the chain |
| | 5–6 | Reserved = 00 |
| | 7 | Fixed/Removable TDE<br>= 1 Fixed. This TDE is not removed from the event/normal queue when the specified event (below) occurs or the TDE is dispatched.<br>= 0 Removable. This TDE is removed from the event/normal queue when the specified event (below) occurs or the TDE is dispatched. |
| | 8–11 | Event Control: The event control bits are used by the EQTDE instruction when the TDE is being enqueued to a TDQ. All TDEs enqueued to an SRC or an SRQ must have event control specified as "normal" (= 0000) or else a specification exception occurs. They control whether the TDE is placed on the normal queue or one of the seventy queues:<br>= 0000 Normal. The TDE is to be enqueued to the normal (dispatchable) TDE queue. These TDEs are ready to be dispatched.<br>= 0001 Empty event. This TDE is to be made dispatchable when there is an attempt to dispatch and empty TDQ ('Normal' TDE queue is empty).<br>= 0011 Resumption event. This TDE is to be made dispatchable |

-continued

| BYTEs | BITs | Description |
|---|---|---|
| | | when the TDQ ('Normal' TDE queue) goes from empty to non-empty.<br>= 0110 More Work event. This TDE is to be made dispatchable when a TDE is added to the TDQ ('Normal' TDE queue).<br>TDEs are enqueued to the event queues in priority order. There may be many "removable" event TDEs for a given event condition, or one "fixed" TDE, but not both. When the specified event occurs the event TDE is "triggered". If it is a fixed TDE, the TDE content is copied and the copied TDE is placed on the normal (dispatchable) queue. If, however, it is a removable TDE, the TDE is moved to the normal (dispatchable) queue. Multiple TDEs may be placed on the dispatchable queue as part of a single operation. For example, if N TDEs are placed on the dispatchable queue, up to N event TDEs (fixed or removable) may also get placed on the dispatchable queue. (Note, for fixed events, copies of the events are created and placed upon the dispatchable queue.) The placement of event TDEs on the dispatchable queue do not themselves cause other events to be triggered. This is true for both fixed and removable events. All event TDEs are placed on the dispatchable queue BEFORE any of the triggering TDEs if they are of the same priority. The Resumption and More Work events are overlapping conditions. If there are event TDEs for both, the resumption event is triggered. If only a More Work event is specified, then that is triggered when the normal queue goes from empty to non-empty. When and event TDE is placed on the normal queue, the event control is set to normal ('0000'B). |
| | 12–15 | Reserved = 0000 |
| 2–6 | | State Flags Vector - The saved state: (The PSW is always saved). |
| | 0 | = 1 GPRs |
| | 1 | = 1 Access Registers |
| | 2 | Reserved (0) |
| | 3 | = 1 Floating Point Registers |
| | 4 | = 1 Vector Registers and Status Register |
| | 5 | = 1 Vector Mask Register |
| | 6–15 | Reserved (0) |
| | 16–31 | = 1 CR0–CR16 (defined CRs only) |
| | 32–39 | Reserved (0) |
| 7 | | TDE Priority: –8-bit unsigned. The Priority assigned to a TDE when enqueued to a TDQ (the priority is ignored when a TDE is enqueued to an SRC or an SRQ - the priority is taken from the SRC or SRQ.) The highest priority is zero. TDEs are enqueued in priority sequence, last within the same priority, when moved to the TDQ (all TDEs on an SRQ or SRC are of the same priority). |
| 8–11 | | Next TDE pointer (if any): If this is the last TDE on the chain, descriptor bit 4 = 0. |
| 16–23 | | Current queue pointer: Address of the TDQ to which this TDE is enqueued. |
| 24–31 | | Reserved |
| 32–xx | | Save Area: (For items specified in the State Flags Vector - when presented on input (e.g., EQTDE) or output (e.g., MTTDE) the items specified in the State Flags Vector are in ADJACENT storage locations (no holes for unselected items). Thus, the offset to any specific set of items depends upon the prior items specified in the State Flags Vector):<br>• 32–35 Instruction Address<br>GPR Contents - Regs 0 through 15.<br>Access Register Contents - Regs 0 through 15.<br>Floating Point Register Contents - Regs 0 through 4.<br>Vector and Status registers<br>Vector Mask Register<br>Control Registers |

Condition Code:

| 0 | Object successfully materialized. |
|---|---|
| 1 | Length specified by L3 was inadequate. |
| 3 | Invalid TDE address. |

Boundary Requirements: None.

Program Exceptions:

Addressing (no associated address space)

Materialize Thread Dispatching Queue (MTTDQ)—This instruction presents the characteristics and contents of the Thread Dispatching Queue (TDQ) in addressable storage.

Format: RRE

MTTDQ Storage_length,Object_address,Storage_address
MTTDQ L3,R1,R2

| B323 | L3 | R1 | R2 |
|---|---|---|---|
| 16 | 24 | 28 | 31 |

Operation: The contents and characteristics of the Thread Dispatching Queue designated by R1 are displayed in the storage location designated by R2 and L3 (starting at the address specified in R2 up to the length specified by L3). L3 is treated as an unsigned binary value. If the number of bytes specified by L3 is inadequate, the operation Simply terminates after L3 bytes have been materialized, and the condition code is set accordingly. The format of the displayed information is:

| BYTEs | BITs | Description |
|---|---|---|
| 0–1 | | Descriptor |
| | 0–3 | Version |
| | 4 | = 0 The Normal dispatching queue is empty (no TDEs) |
| | | = 1 The Normal dispatching queue has one or more TDEs enqueued |
| | 5 | = 0 The Empty Event queue is empty (no TDEs) |
| | | = 1 The Empty Event queue has one or more TDEs enqueued |
| | 6 | = 0 The Resumption Event queue is empty (no TDEs) |
| | | = 1 The Resumption Event queue has one or more TDEs enqueued |
| | 7 | = 0 The More Work Event queue is empty (no TDEs) |
| | | = 1 The More Work Event queue has one or more TDEs enqueued |
| | 8–15 | unused |
| 2–3 | | unused |
| 4–7 | | Short Waiters Count: The number of SRCs which have their short wait descriptor bit set and which currently have one or more waiting TDEs. Initial value is 0. This is described under SRCs and the SRC-related instructions. |
| 8–11 | | Normal TDE Queue: Pointer to the first dispatchable TDE (Bit 4 of the descriptor = 1 if a TDE is enqueued). |
| 12–15 | | Empty Event 7DE Queue: Pointer to the first event TDE (Bit 5 of the descriptor = 1 if a TDE is enqueued). |
| 16–19 | | Resumption Event TDE Queue: Pointer to the first event TDE (Bit 6 of the descriptor = 1 if a TDE is enqueued). |
| 20–23 | | More Work Event TDE Queue: Pointer to the first event TDE (Bit 7 of the descriptor = 1 if a TDE is enqueued). |
| 24–31 | | Parent TDQ address (optional): The TDQ which is to be dispatched if this TDQ runs out of work. |

Condition Code:

| 0 | Object successfully materialized. |
|---|---|
| 1 | Length specified by L3 was inadequate. |
| 3 | Invalid TDQ address. |

Boundary Requirements: None.
Program Exceptions
Addressing (no associated address space)

Purge (PURGE)—This instruction destroys all the objects associated with the designated address space.

Format: RRE

```
PURGE address
PURGE R1
```

| B3F1 | //////// | R1 | // |
|---|---|---|---|
| 16 | 24 | 28 | 31 |

Operation: Depending upon the addressing mode, the associated address space specified by R1 is determined and all the objects associated with that address space are destroyed. If register 0 is specified by R1 then all objects associated with ALL address spaces are purged. This instruction is privileged.
Condition Code: Unchanged.
Boundary Requirements: None.
Program Exceptions:
Privileged Operation Receive Count (RECC)—This instruction causes the current value of the counter to be compared to a set limit.

Format: RRE

-continued
```
RECC Owner,Limit,SRC_address
RECC R4,R1,R2
```

-continued

| B344 | // | R4 | R1 | R2 |
|---|---|---|---|---|
| 16 | 20 | 24 | 28 | 31 |

Operation: If the register designated by R1 is zero, then limit value in the counter is used as the limit. Otherwise the limit value in the designated register is used as the limit. The counter value in the SRC, designated by R2, is then compared to the limit value.

If the value of the counter is greater than or equal to the limit value:
If the limit value in the counter is being used, the counter value is decremented by the limit value.
If the register indicated by R4 is not zero, the content of the register specified by R4 is saved as the "owner" of the SRC. (A value of 0 is used to indicate no owner.)
The instruction completes.
If the value of the counter is less than the limit value:
The current state is saved in a TDE and is enqueued onto the SRC wait queue.
If the SRC has the Short Wait Option set and no TDEs were previously waiting, the SRC is placed in the short wait state (Engineering Note: the Short Waiters Count in the associated TDQ is incremented).
If the limit value in the counter is being used, the instruction completes, otherwise the instruction is nullified (so that the instruction is re-executed to check the limit value specified in the instruction).
The thread dispatcher is invoked.
Condition Code: Unchanged.
Boundary Requirements: None.
Program Exceptions
Addressing (no associated address space, no TDE space available)

Specification (invalid SRC address, invalid associated TDQ (Note: It is not required that the implementation check during the execution of the instruction for the existence of a valid associated TDQ, but if it attempts to use the associated TDQ and finds there is none this exception can be generated.))
TDQ Empty Receive Message (RECM)—This instruction causes a Thread Send/Receive Message to be received from a specified Thread Send/Receive Queue.

Format: RRE

RECM Search_type,Priority,Message,SRQ_address
    RECM I3,R4,R1,R2

| B34C | I3 | R4 | R1 | R2 |
|---|---|---|---|---|
| 16 | 20 | 24 | 28 | 31 |

Operation: The SRMs on the SRQ designated by R2 are searched sequentially, starting with the first SRM. The search is controlled by the Priority designated by bits 24–31 of R4. The first SRM satisfying the Search_type, designated by I3, is dequeued. The message is placed in the register designated by R1 and the actual priority of the message is placed in bits 24–31 of R4. The type of register (GPR, FPR, etc.) designated by R1 is determined from the Message Type of the SRQ. The meaning of the Search Type is:

| BITs | Description |
|---|---|
| 0 | Message Priority = Search_Priority |
| 1 | Message Priority < Search Priority |
| 2 | Message Priority > Search_Priority |

The Search_Type is the logical inclusive OR of the designated bits. For a Search Type of binary 000x, no priority will satisfy the search type, therefore, this combination is invalid. A specification exception occurs. For a Search Type of binary 111x, the first message is dequeued. If no message satisfies the Search_type, or if the message list is empty, R1 and R4 are not altered and the instruction is nullified. The current state is saved in a TDE and enqueued to the SRQ wait list and the thread dispatcher is invoked.
    Condition Code: Unchanged.
    Boundary Requirements: None.
    Program Exceptions:
Addressing (no associated address space, no TDE space available)
Specification (invalid SRQ address, invalid Search Type)
TDQ Empty Send Count (SENDC)—This instruction causes the current value of the count field of the SRC (Thread Send/Receive Counter) to be incremented.

Format: RRE

SENDC New_Count,owner,Increment,SRC_address
    SENDC R3,R4,R1,R2

| B341 | R3 | R4 | R1 | R2 |
|---|---|---|---|---|
| 16 | 20 | 24 | 28 | 31 |

Operation: If R4 does not indicate register zero, the content of the register designated by R4 is compared to the "owner" value of the SRC. If the SRC is not "owned", or if it is "owned" but the values are not the same, a specification exception is signaled and the execution of the instruction is halted. This is useful for debugging locking violations when the SRC is used as a lock. The current value of the count field in the SRC (Thread Send/Receive Counter) designated by R2 is incremented by the value contained in R1. If the new count value is greater than or equal to the limit value in the counter:
    The value of the counter is decremented by the value of the limit.
    The new value is returned in the register designated by R3.
    If the wait list is not empty, then, depending upon the value of byte 0 bit 7 of the SRC:
    ALL All the TDEs are dequeued form the wait list and enqueued in priority sequence on the associated TDQ.
    ONE The first TDE is dequeued from the wait list and enqueued in priority sequence on the associated TDQ.
    If the SRC has the Short Wait Option set, and TDEs were in wait on the SRC, and no TDEs remain in wait on the SRC, then the SRC is no longer in short wait (Engineering Note: the Short Waiters Count in the associated TDQ is decremented).
    When one or more TDEs from an SRQ or SRC are enqueued to a TDQ and the TDQ contains TDEs at a higher priority, the current state is saved in a TDE (at the same priority as the TDEs from the SRQ or SRC) and enqueued in priority order to the TDQ. The thread dispatcher is then invoked causing a thread switch to occur. This thread switch is referred to as a preempt wait to the thread issuing the send operation.
If the new count value is less than the limit value in the counter:
    The new value is returned in the register designated by R3. If the counter would overflow, the value is not incremented and the instruction is nullified. A fixed point overflow exception is signaled. When a SENDC is issued, the SRC is removed from the "locked" state (this supports debugging of SRCs used as locks). This means that the "owner" value of SRC is set to zero indicating that it is "unlocked" by any TDE.
    Condition Code: Unchanged.
    Boundary Requirements: None.
    Program Exceptions
Addressing (no associated address space, no TDE space available)
Specification (invalid SRC address, invalid associated TDQ, unequal "owner" values)
Fixed Point Overflow (SRC counter overflow)

Send Count and Wait (SENDCW)—This instruction causes the value of the SRC (Thread Send/Receive Counter) to be incremented by an amount contained in a register designated in the operand. The state of the thread issuing the instruction is saved in a TDE and enqueued onto the SRC wait queue.

Format: RRE

SENDCW Increment,SRC_address
    SENDCW R1,R2

| B342 | // | // | R1 | R2 |
|---|---|---|---|---|
| 16 | 20 | 24 | 28 | 31 |

Operation: The value of the SRC designated by R2 is incremented by the value contained in the register designated by R1. The state of the thread issuing the instruction is saved in a TDE and enqueued onto the SRC wait queue. If the new count value is greater than or equal to the limit value in the counter, the value of the counter is decremented by the value of the limit. Then, depending upon the Dispatch Control Option of the SRC:

ALL All the TDEs are dequeued from the wait list and enqueued in priority sequence on the associated TDQ.

ONE The first TDE is dequeued from the wait list and enqueued in priority sequence on the associated TDQ.
If the SRC has the Short Wait Option set, and TDEs were in wait on the SRC, and no TDEs remain in wait on the SRC, then the SRC is no longer in short wait (Engineering Note: the Short Waiters Count in the associated TDQ is decremented). The thread dispatcher is then invoked. The "owned" state and value are unaffected.

Condition Code: Unchanged.
Boundary Requirements: None.
Program Exceptions:
Addressing (no associated address space, no TDE space available)
Specification (invalid—SRC address, no associated TDQ defined)
TDQ Empty
Fixed Point Overflow (SRC counter overflow)

Send Message (SENDM)—This instruction causes the message list of the designated SRQ (Thread Send/Receive Queue) to be searched, in sequence beginning with the first message, and the message is enqueued within priority order.

Format: RRE

SENDM Enqueue_type,Priority,Message,SRQ_address
SENDM I3,R4,R1,R2

| B349 | I3 | R4 | R1 | R2 |
|------|----|----|----|----|
| 16   | 20 | 24 | 28 | 31 |

Operation: The message list of the SRQ designated by R2 is searched, in sequence, beginning with the first message. The message, contained in the register designated by R1, is enqueued First/last, as designated by the value of I3 (00x= First, 01x= Last), within priority order. The priority of the message is specified by bits 24–31 of R4. The type of the register (GPR, FPR, etc.) designated by R1 is determined from the Message Type field of the SRQ. If there are no messages of the same priority, the new message is enqueued before the first message with a larger priority value, or last if there is none. The priority is treated as an unsigned binary value. The Dispatch Control Option of the SRQ determines the TDEs (Thread Dispatching Elements) that are dequeued from the SRQ wait list and enqueued in priority sequence to the TDQ (Thread Dispatching Queue) specified in the TDE. The Dispatch Control Option is:

ALL All the TDEs are dequeued form the wait list and enqueued in priority sequence on the associated TDQ.

ONE The first TDE is dequeued from the wait list and enqueued in priority sequence on the associated TDQ.
When one or more TDEs from an SRQ or SRC are enqueued to a TDQ and the TDQ contains TDEs at a higher priority, the current state is saved in a TDE (at the same priority as the TDEs frown the SRQ or SRC) and enqueued in priority order to the TDQ. The thread dispatcher is then invoked causing a thread switch to occur. This thread switch is referred to as a preempt wait to the thread issuing the send operation.

Condition Code: Unchanged
Boundary Requirements: None
Program Exceptions:
Addressing (no associated address space, no message space available, no TDE space available)
Specification (invalid SRQ address, invalid associated TDQ, invalid Enqueue_type)

Set Counter Limit Value (SETCLV)—This instruction sets the limit of the designated Thread Send/Receive Counter (SRC) to the designated value.

Format: RRE

SETCLV Operation,SRC_address,Limit
SETCLV I3,R1,R2

| B343 | I3 | // | R1 | R2 |
|------|----|----|----|----|
| 16   | 20 | 24 | 28 | 31 |

Operation: The counter designated by R1 is modified as indicated by the I3 field and the value designated by R2, which is treated as an unsigned binary 32 value. The meaning of the I3 values is:

| I3 | Meaning |
|----|---------|
| 0  | Set the limit value equal to the R2 value. |
| 1  | Increment the current value by the R2 value. |
| 2  | Decrement the current value by the R2 value. |

If the new limit value is less than or equal to the count value of the SRC and the wait list is not empty, then depending upon the Dispatch Control Option of the SRC:

ALL All the TDEs are dequeued from the wait list and enqueued in priority sequence on the associated TDQ.

ONE The first TDE is dequeued from the wait list and enqueued in priority sequence on the associated TDQ.
If the SRC has the Short Wait Option set, and TDEs were in wait on the SRC, and no TDEs remain in wait on the SRC, then the SRC is no longer in short wait. When one or more TDEs from an SRQ or SRC are enqueued to a TDQ and the TDQ contains TDEs at a higher priority, the current state is saved in a TDE (at the same priority as the TDEs from the SRQ or SRC) and enqueued in priority order to the TDQ. The thread dispatcher is then invoked causing a thread switch to occur. This thread switch is referred to as a preempt wait to the thread issuing the send operation. If the operation would cause an overflow or underflow the operation is initiated and an exception signaled.

IMPLEMENTATION EXAMPLES

Figure 6:
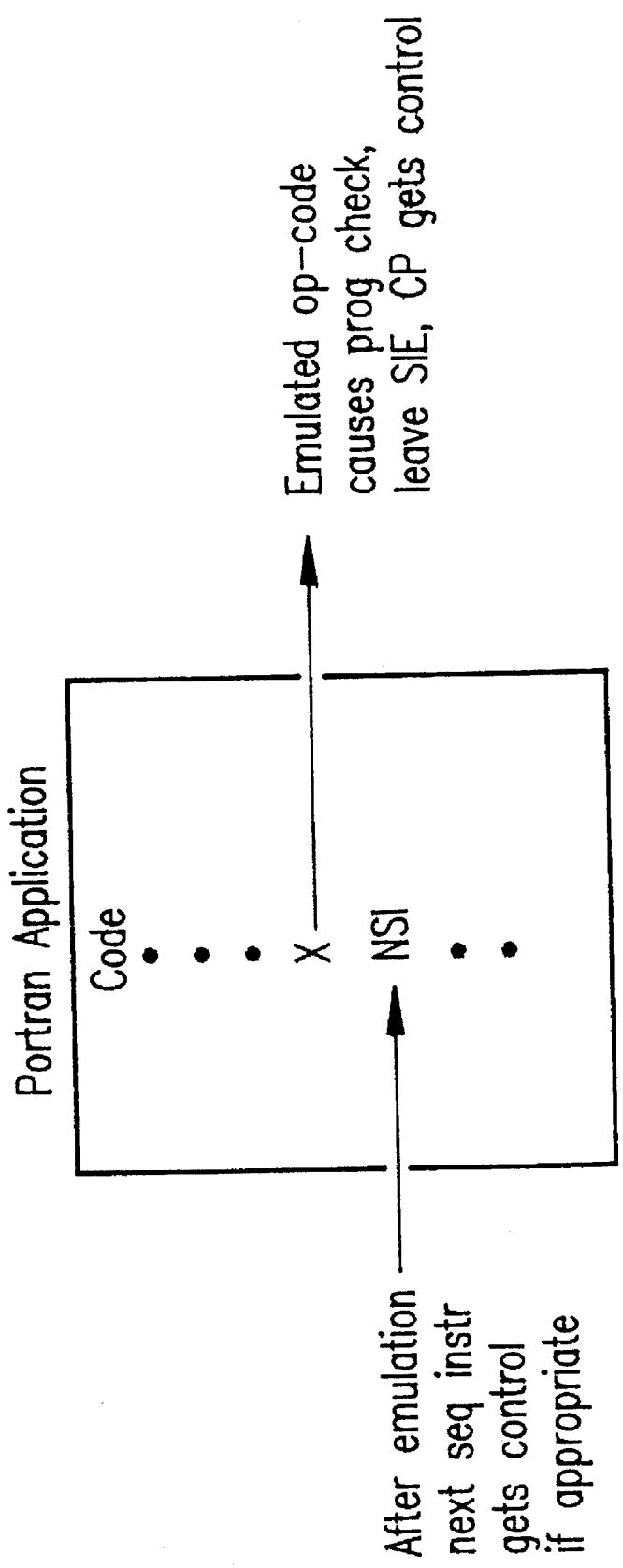
FIG. 6 is a block diagram of the small grain facility (SGF) emulation overview.

In one embodiment, the invention implements parallel FORTRAN functions. This by way of illustrative example only and is for the purpose of demonstrating a specific application of the invention. FIG. 6 is a block diagram of the small grain facility (SGF) emulation overview. The assumption for this example is that a FORTRAN application is running on an ESA/370 computer under the VM operating system wherein multiple virtual CPUs are defined for a given virtual machine. The FORTRAN code includes an opcode "X" which is the emulated opcode. In the software emulation, the emulated opcode causes a SIE (system intrepretive execution) intercept and an exit from SIE, as described in the IBM System/370 Extended Architecture Interpretive Execution, IBM Publication SA22-7095. At this point the control program (CP) of the VM operating system gets control to perform the software emulation. In a hardware implementation, the opcode is executed directly. After software emulation or hardware execution, the next sequential instruction (NSI) gets control, if appropriate, and the FORTRAN application processing continues.

There are a number of proposals regarding the method for creating parallel processes. Some are explicit (e.g., user-defined) and others are implicit (e.g., automatic DO loop parallelization). Regardless of the method, at some point it is necessary that the environment create the necessary process structures. This includes identification, and possibly loading, of code (load modules) and the allocation of storage. In addition to creating the execution structures of the operating system environment (e.g., MVS=task, VM=Virtual processor), the parallel environment will create threads representing independent threads of execution by doing an EQTDE (Enqueue Thread Dispatching Element) to a TDQ (Thread Dispatching Queue) and a DTDQ (Dispatch Thread Dispatching Queue) to invoke the thread dispatcher. Although there are a number of alternatives, it is assumed here that messages and message queues will be used to define the message units of parallel work.

Work Synchronization

Figure 7:
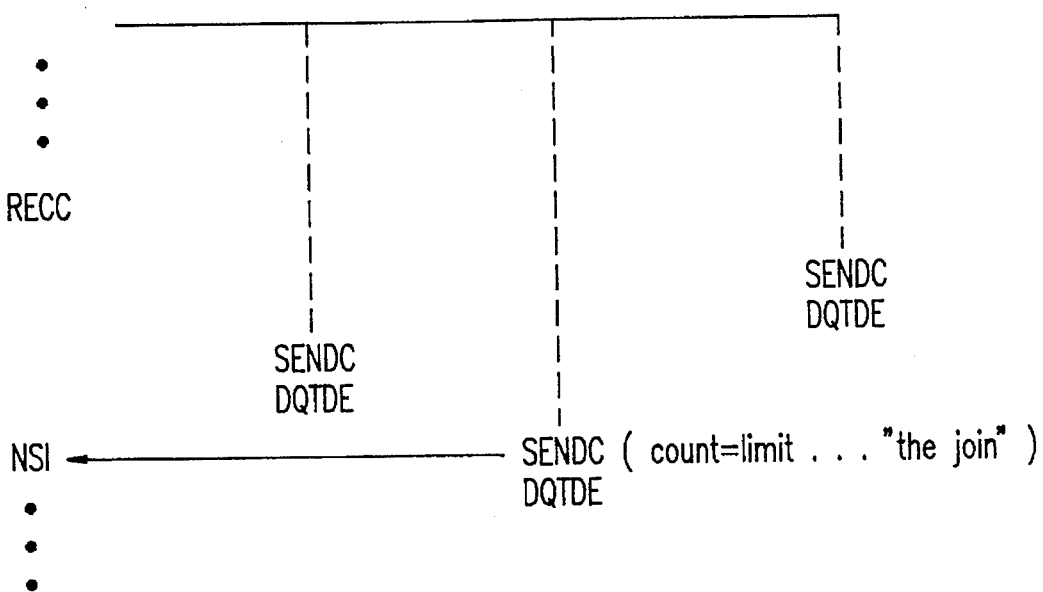
FIG. 7 is a graphical illustration of a fork and join scenario using the small grain facility (SGF) according to the invention.

There are a number of situations in which a process must wait for one or more other processes. One variation is where a parent spawns a number of children and then at some point waits for their completion. Upon completion, the parent continues, typically after the parent issues a JOIN or similar statement. FIG. 7 illustrates the scenario of a fork and join using the small grain facility (SGF) according to the invention. The application program includes a plurality of lines of code, only some of which are represented in the figure. One of these lines of code, the EQTDE instruction defined above, creates work elements (i.e., threads). This is followed by the CRSRC instruction which creates a thread send/receive counter. Then the SETCLV instruction sets limits to the number of processes spawned. The EQTDE instruction spawns the processes; e.g., this is the "fork". In the example illustrated, in addition to the main line of application code (i.e., the "parent"), there are three processes (i.e., children) spawned. The main line of code continues until it issues the Receive Count (RECC) instruction. The spawned processes execute until complete at which time they each, in turn, encounter the Send Count (SENDC) instruction. The spawned processes or threads terminate with the Dequeue Thread Dispatch Element (DQTDE) instruction. The count sent by the second of the spawned processes is equal to the count limit set by the Set Count Limit Value (SETCLV) instruction, at which point the parent process executes the next sequential instruction (NSI).

For the JOIN, the FORTRAN compiler generates an SRC (Thread Send/Receive Counter) and the inline code RECC SRC_address. For the FORK (activate parallel thread) function, the compiler generates code to increment the SRC counter limit value. This keeps track of the number of parallel tasks. The compiler must also generate, as part of the thread termination code, the instruction SENDC SRC_address to signal that an offspring thread has completed. When the parent thread issues the RECC instruction, it will proceed if the count has been reached, indicating all offspring threads have terminated, or wait until the last offspring thread issues its SENDC instruction.

Another variation is the wait for a specific thread. To accomplish this, the message facility is used. The compiler generates an SRQ (Thread Send/Receive Queue) for every created thread. These are input message queues. In the thread where the WAIT is issued, the compiler generates the inline code RECM EQUAL,Thread_id,SRM_reg,SRQ_address. The thread waits for a message on its input queue from the designated thread. Alternatively, the option to wait or not can be specified on a receive message type function. If a wait is desired, the RECM instruction is used, but if waiting is not desired, the DQM (Dequeue Message) instruction is used to dequeue a message and set a return code.

Figure 8:
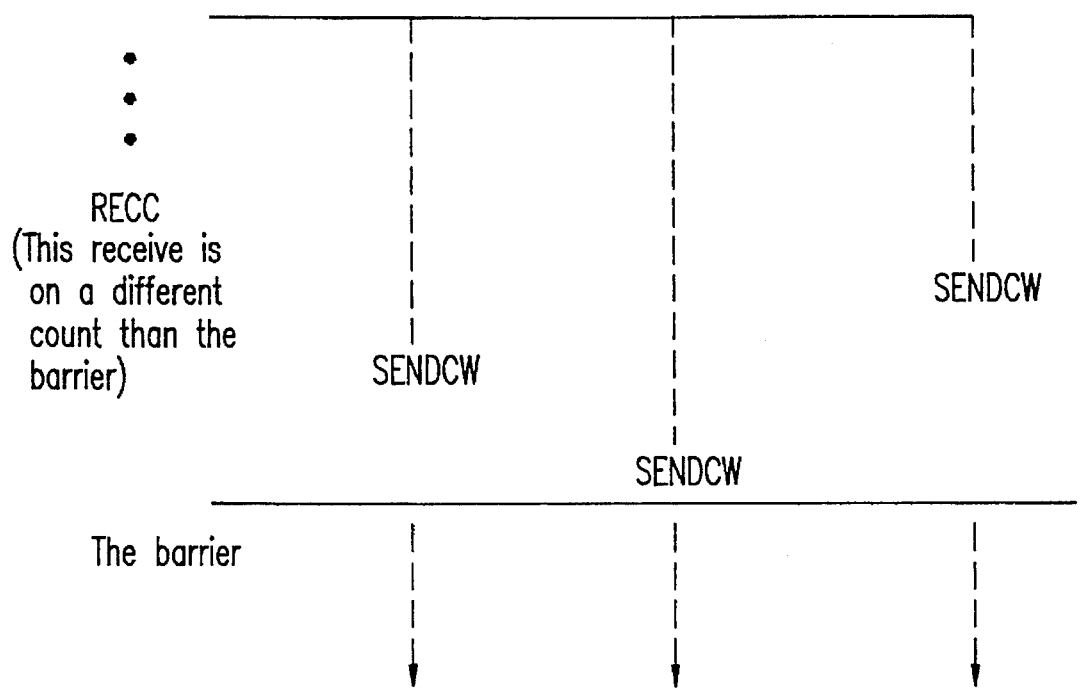
FIG. 8 is a graphical illustration of a barrier scenario which is similar to that of the fork and join scenario shown in FIG. 7 except that each of the spawned processes cannot complete until they receive the result of the processing by one of the processes.

Barriers are parallel functions which provide a simple way for a number of parallel processes to synchronize. There is no communication, just simply the ability to ensure that all the processes have arrived at a given barrier before any of them are allowed to proceed. FIG. 8 shows a barrier scenario which is similar to that of the fork and join scenario shown in FIG. 7 except that each of the spawned processes cannot continue beyond the SENDCW until all reach the barrier. When the spawned processes reach the barrier, they send a Send Count and Wait (SENDCW) instruction.

A barrier has two elements; the determination of the processes making up the "group" and the number of processes in the group. It is assumed here that the FORTRAN programmer codes one or more procedures of the form

```
          . . .
     BARRIER A
          . . .
     BARRIER B
          . . .
```

A process group is then invoked whose procedures contain these statements. The user expects synchronization at each of the named barriers. To provide this, the FORTRAN environment must do the following. The compiler generates a storage area for the SRC (Thread Send/Receive Counter) and inline code to access the counter:

```
          . . .
     SENDCW SRC_A /* Arrival at barrier A */
          . . .
     SENDCW SRC_B /* Arrival at barrier B */
          . . .
```

When the number of processes in the group is determined (at compile or run time), the "limit" value in the counters is set to the size of the group. The dispatching bit in the SRC is set to dispatch all the TDEs when the count is reached.

Simple locking functions can be based on the SRC or SRM mechanisms. For example, a simple locking mechanism can be implemented using an SRC wherein for a specified lock, A, the compiler creates an SRC, SRC_A, initialized with a current and limit value of one. A LOCK is implemented as: RECC SRC_A /*If lock=1, get and set=0*/ An UNLOCK is implemented as: SENDC SRC_A /*Lock value=1=available*/

Work Management

The ability to define event TDEs allows for easy handling of some difficult queue management problems and also provides the basis for dynamic "scheduling" of the processing of units of work. Fixed event TDEs allow an arbitrary number of threads to be activated upon demand. The fact that it is not necessary to know how many processes may access the TDQ can be used to advantage in dynamically "scheduling" the work activity of processes. If processes finish work which they are doing and go to a work queue for work, a fixed event TDE can be used to "recruit" available processes to help with some work. This approach makes work "scheduling" and management less static and easier to manage since much of the work management code need not worry about how many tasks are doing what.

The following is a simplified example of how a TDQ with "event" TDEs can be used to manage the deactivation and reactivation of system tasks as the workload fluctuates. Assuming a steady state situation in which a number of system tasks have been initiated and are processing work, in order to detect "no work" situations, a "no work event" TDE has been enqueued to the TDQ. This is a "fixed" TDE which detects the "empty" TDQ condition. Thus, it will be activated by every system task which encounters this situation. The "no work event" does the following:

```
NO_WORK:
    DCL STATE INIT(SET_ALARM)
    SELECT(STATE)
        WHEN(SET_ALARM)
            STATE = GOTO_SLEEP
            EQTDE WAKEUP_TDE, DISPATCH_Q,
                [HI_PRIORITY, REMOVABLE, ON_NEW_TDE]
            /* WAKEUP EVENT */
            DTDQ DISPATCH_Q /* SEE IF ANY WORK
                                SNEAKED IN */
        WHEN(GOTO_SLEEP)
            WAIT
            SLEEP = SET_ALARM
            DTDQ DISPATCH_Q /* GO FIND WORK */
END SELECT
```

The wakeup TDE does the following:

```
WAKEUP:
    IF (TASK_TO_BE_POSTED = ME) /* AVOID
        UNNECESSARY POST/WAIT */
        STATE = SET_ALARM
    ELSE /* WAKE THAT LAZY THING */
        POST
    END
    DTDQ DISPATCH_Q /* GO DO SOME WORK */
```

There is no locking in these work control routines so that it is impossible to be interrupted while holding critical resources. The potential race condition between setting the wakeup event and the arrival of work is handled by dispatching the TDQ again after the event is set. One of three things may happen:

i. Work did not arrive (most likely case), in which case the no-work TDE is re-invoked to complete phase two of the task determination.

ii. Work arrived after the event was set and before the DTDQ, in which case the DTDQ will cause the work to be performed. Later arrival of another piece of work may cause the event to be processed (POST). If this system task runs out of work, it may again perform the no-work TDE and process phase two. It will immediately satisfy the WAIT, redispatch the queue and re-invoke itself in phase one.

iii. Work arrived before the event was set, in which case the DTDQ will cause the wakeup TDE to be dispatched (since it has higher priority than the work). It discovers that it is trying to wake itself up (otherwise, this is case 2) and simply resets the state to SET_ALARM and then dispatches the work on the queue.

The only penalty, then, due to the race condition is the unlikely occurrence of the second situation (which has a window of one instruction). The benefit is no exposure to interruption while holding critical resources.

Figure 9:
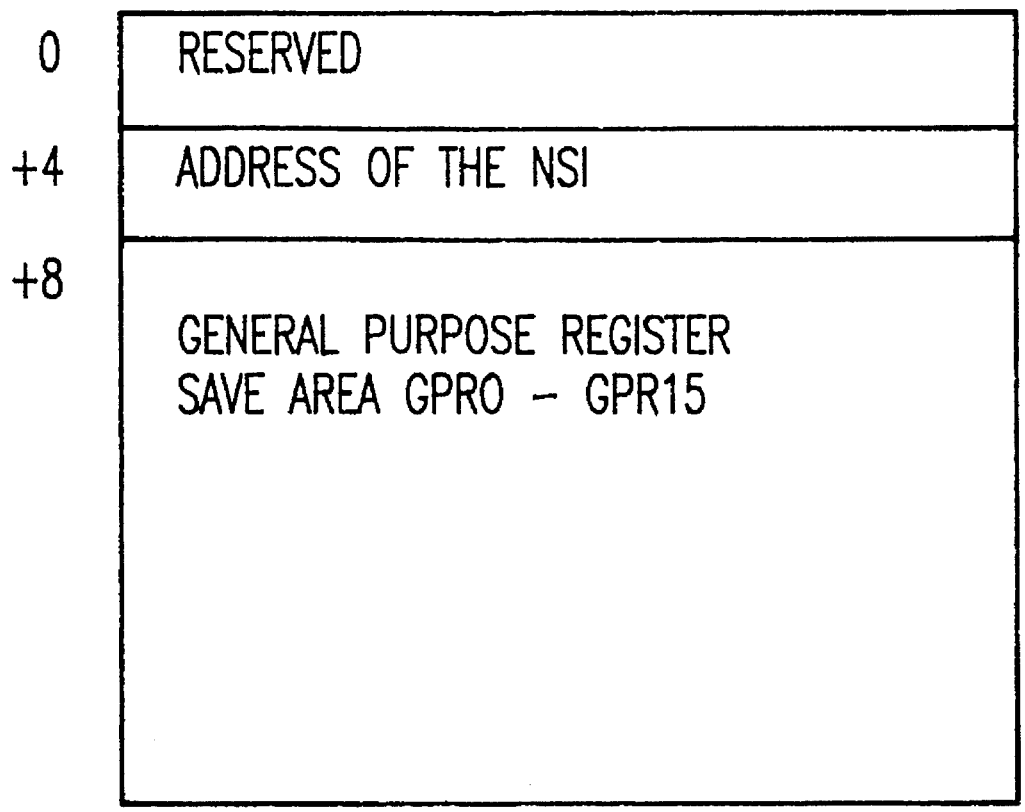
FIG. 9 is a diagram showing the data structure of the state vector used to control the creation and dispatching of computer processes.

The implementation of the small grain facility (SGF) according to the invention may be in either software or hardware or a combination of both. In any case, the SGF uses a state vector (SV) having the data structure shown in FIG. 9 to control the creation and dispatching of computer processes. The data flow shown in FIG. 10 assumes a software implementation under the VM (Virtual Machine) operating system (OS) running on an ESA/370 environment in which there are N virtual CPUs associated with a given virtual machine. A particular feature of the invention is the provision of an encapsulated object memory 401 which is accessed via the virtual machine 402 and not accessible directly by the user. Within the virtual machine 402, SGF anchors $421_0, 421_1, \ldots, 421_n$ are provided, one for each of the virtual CPUs $422_0, 422_1, \ldots, 422_n$. S/370 architecture provides program save areas (PSAs) for each virtual CPU in the system. An SGF anchor is held within each PSA. This is a detail specific to this embodiment of the invention and is not required in the general practice of the invention. The encapsulated object memory 401 is accessed via the SGF anchor block for a particular virtual CPU which points to an SGF vector table (SVT) address 411 that identifies a particular SGF vector in the SGF vector table 412. The SGF vector table includes a cell pool pointer which points to a private area 4 13 in memory, a prime TDQ pointer, a CPU GOWORD and lock, and a CPU TDE pointer. The memory 413 includes a static SGF cell pool containing SGF data structures and a bit map of the cell pool.

Figure 11:
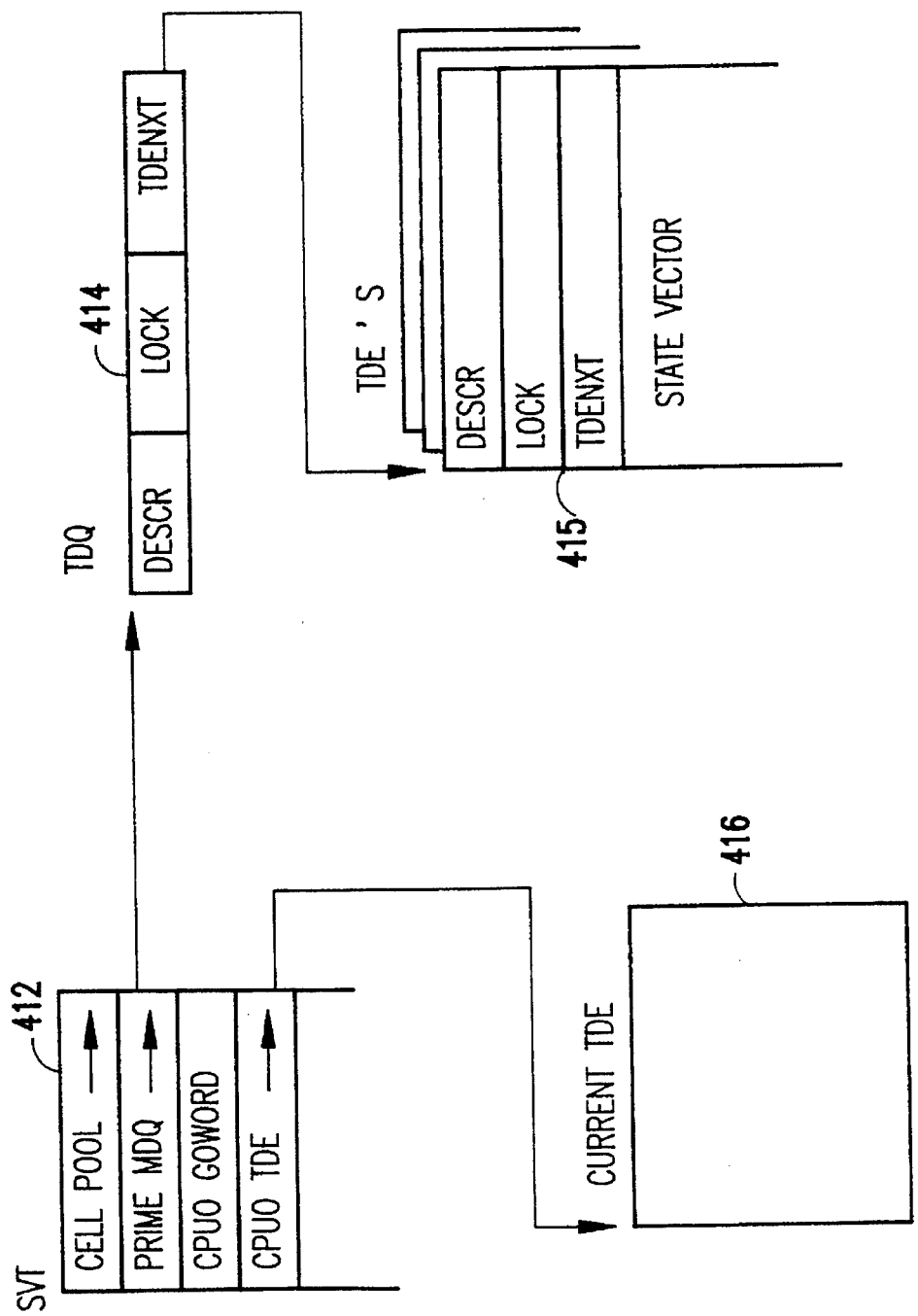
FIG. 11 is a diagram showing in more detail the dispatcher data structure.

FIG. 11 shows in more detail the dispatcher data structure. The prime TDQ pointer in SGF vector table 412 points to the TDQ 414. The TDQ 414 includes a descriptor (DESCR), a lock, and the address of the next TDE (TDENXT) in the queue. The address of the next TDE points to the TDEs 415 in the queue, each of which comprise a header identifying the TDQ and the SGF vector shown in FIG. 9. The SGF vector table 412 also includes a pointer to the TDE for the virtual CPU (VCPU) on which it is running. This pointer points to the current TDE 416.

Figure 10:
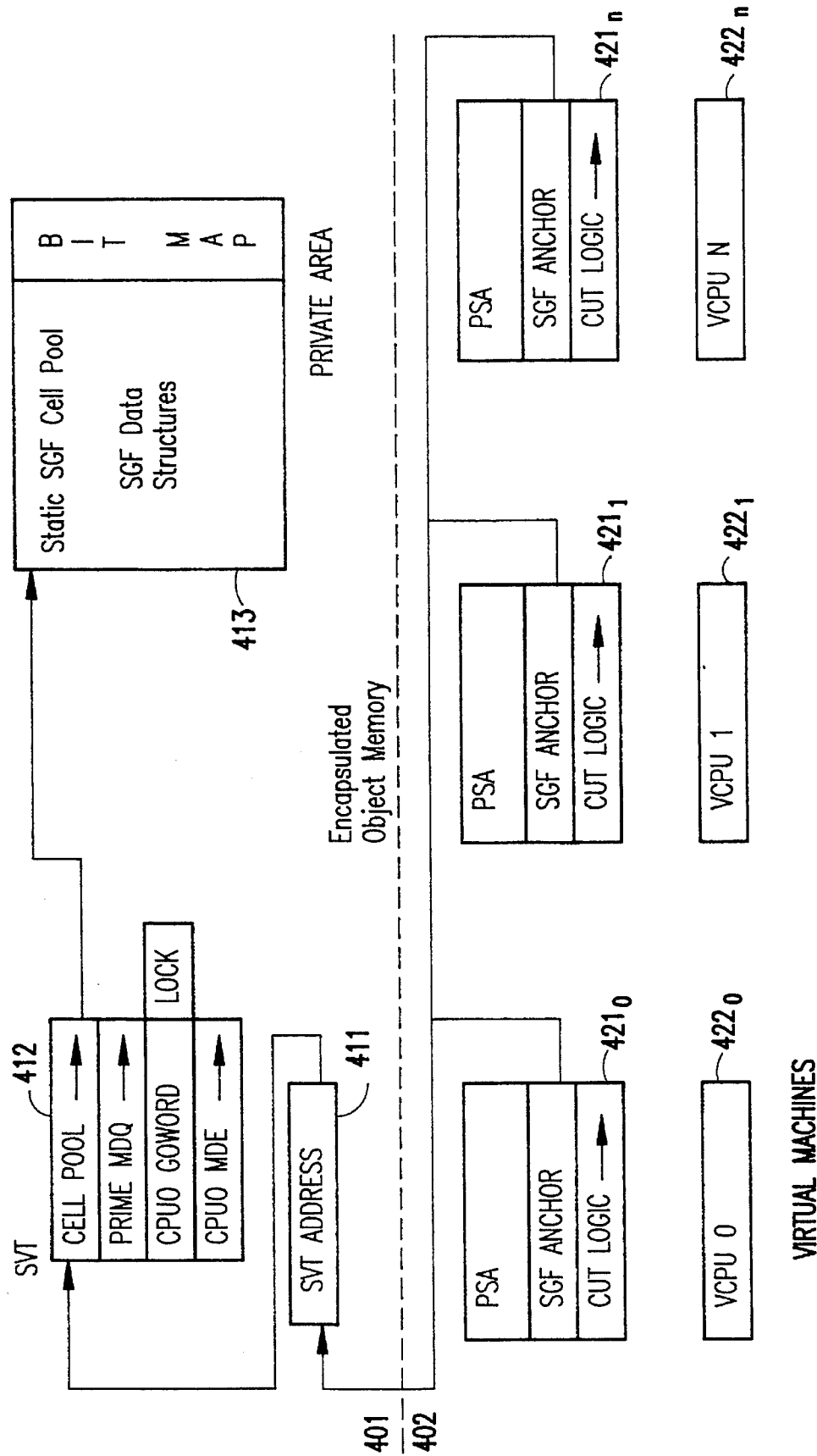
FIG. 10 is a data flow diagram which assumes a software implementation under the VM (Virtual Machine) operating system (OS) running on a ESA 370 environment.
Figure 12:
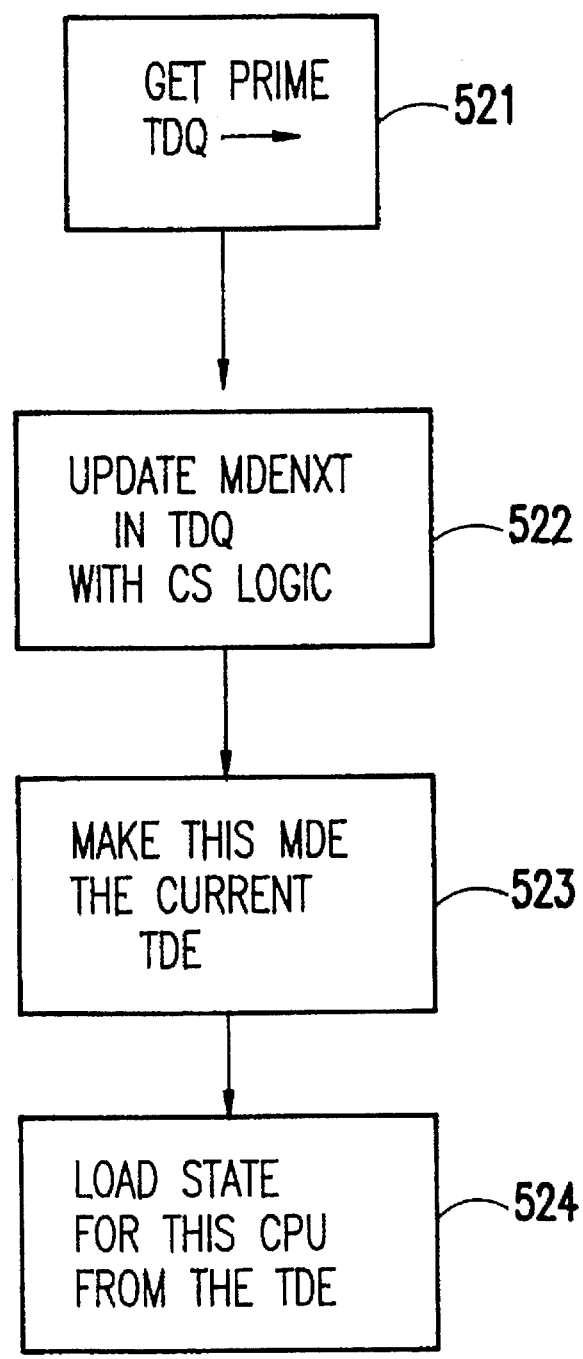
FIG. 12 is a flowchart showing the logic of the thread dispatcher control flow.

FIG. 12 shows the flowchart for the thread dispatcher control flow. The process begins in function block 521 by getting the prime TDQ pointer from the vector table 412 (FIG. 10). Then in function block 522, the next TDE is updated in the TDQ using the compare and swap logic supported by the S/370 architecture for the specific environment taken as the example. The updated next TDE is made the current TDE in function block 523 and then, in function block 524, the state for the virtual CPU is loaded from the TDE. If there is no work, then the triggered wait TDE will be found.

Figure 13:
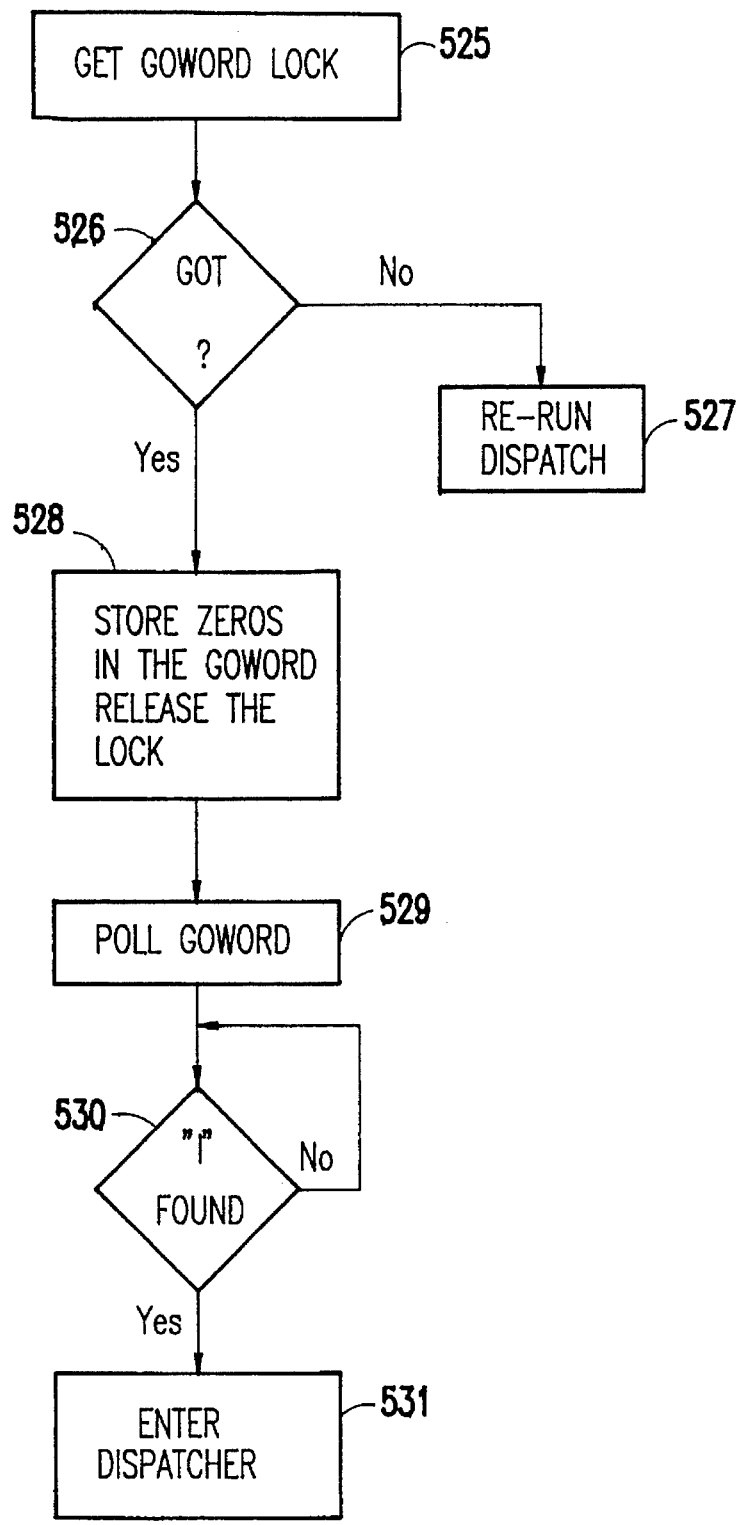
FIG. 13 is a flowchart for the triggered wait logic which is invoked from the dispatcher control flow of FIG. 12.

FIG. 13 shows the flowchart for the triggered wait logic. This process begins in function block 525 by getting the GOWORD lock. A test is made in decision block 526 to determine if the GOWORD lock has been obtained. If not, the re-run dispatch is invoked in function block 527 and a return is made. On the other hand, if the GOWORD lock has been obtained, zeros are stored in the GOWORD and the lock is released in function block 528. Then, in function block 529, the GOWORD is polled for a "1", and if a "1" is found in decision block 530, the dispatcher is entered in function block 531.

Figure 14:
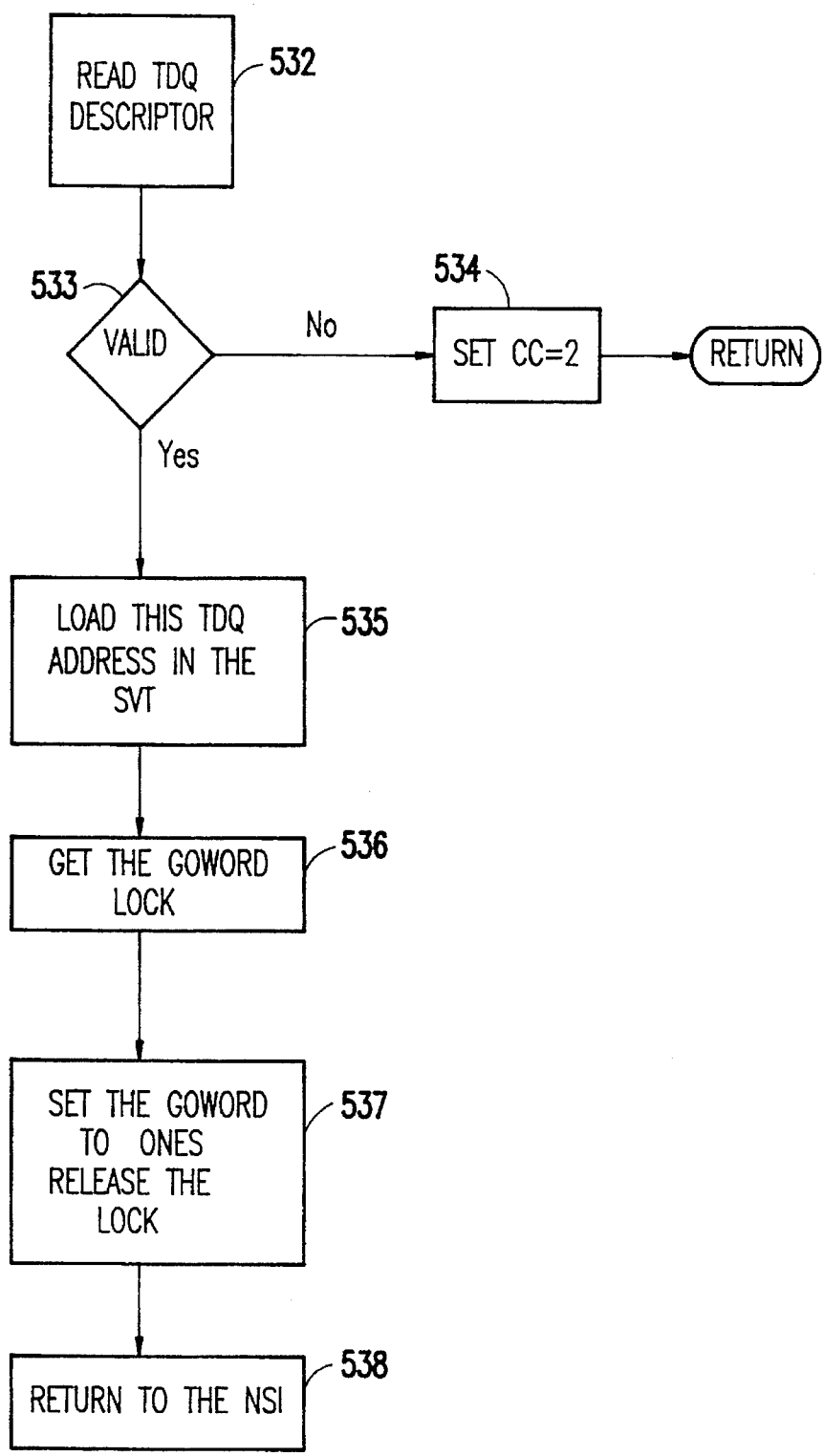
FIG. 14 is a flowchart for the Dispatch Thread Dispatching Queue (DTDQ)

The flowchart for the Dispatch Thread Dispatching Queue (DTDQ) is shown in FIG. 14. The process begins in function block 532 by reading the TDQ descriptor. A test is next made in decision block 533 to determine if a valid token has been found. If not, CC is set to "2" in function block 534 and a return is made, which will cause transfer to an address exception handling routine. When a valid token is found, the TDQ address is loaded in the state vector table (SVT) (4 12 in FIG. 11) in function block 535, making this the prime TDQ. Then, the GOWORD lock is obtained in function block 536, and in function block 537, the GOWORD is set to ones and the lock released. This will trigger any waiting processors. Finally, a return is made to the next sequential instruction (NSI) in function block 538.

Figure 15:
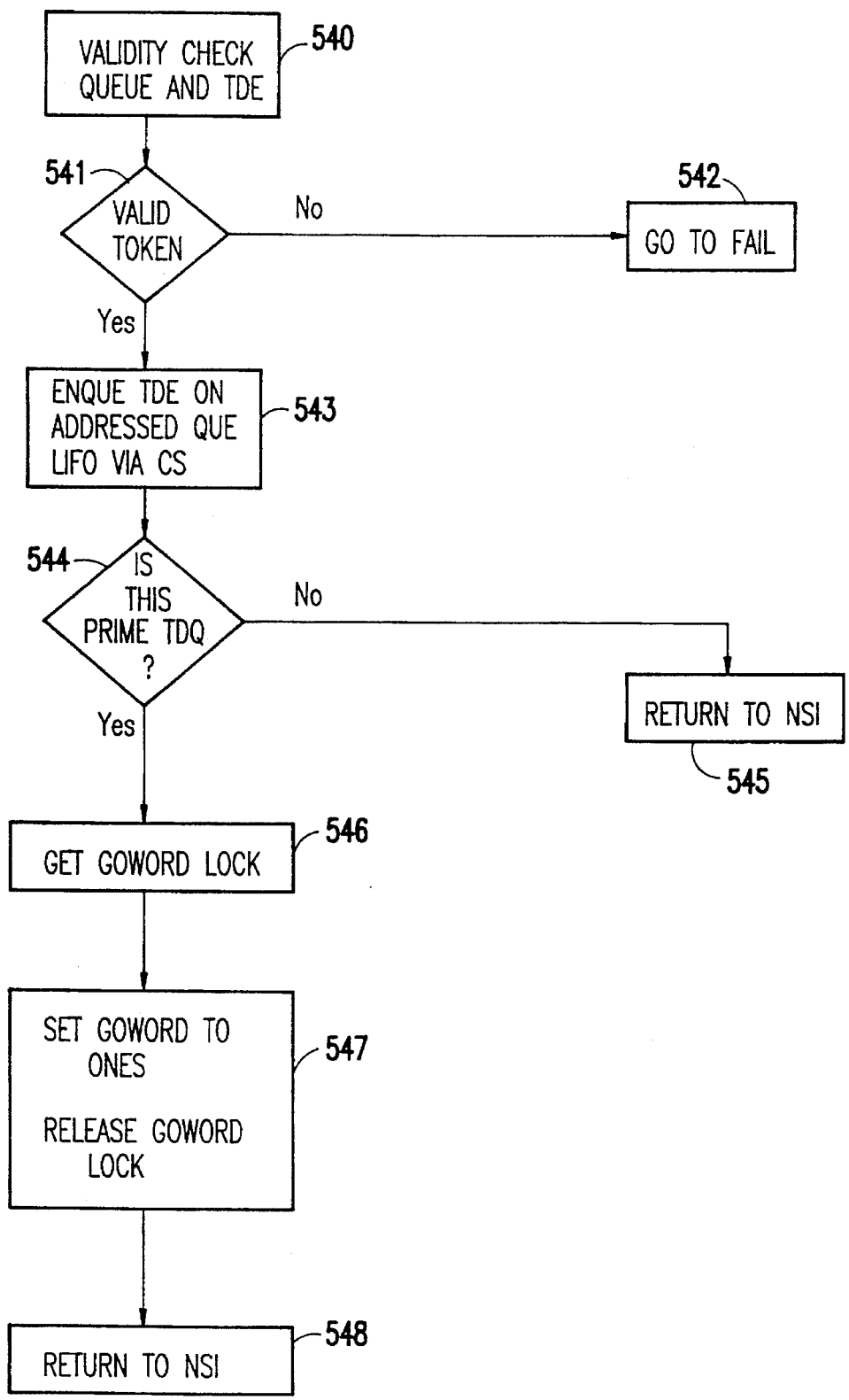
FIG. 15 is a flowchart for the Enqueue Thread Dispatching Element (EQTDE)

The flowchart for the Enqueue TDE is shown in FIG. 15. The process begins in function block 540 where a validity check is made of the token. In decision block 541 a decision is made as to whether the token is valid. If it is not, the process fails in function block 542, but if it is valid, the TDE is enqueued in function block 543 on the addresses queue LIFO (last in, first out) stack via the compare and swap of the VM OS. A test is next made in decision block 544 to determine if this is the prime TDQ. If it is not, a return is made to the next sequential instruction (NSI) in function block 545. On the other hand, if it is the prime TDQ, work has been created and, in function block 546, the GOWORD lock is obtained. The GOWORD is set to ones and the lock is released in function block 547. Finally, a return is made to the next sequential instruction in function block 548.

Figure 16:
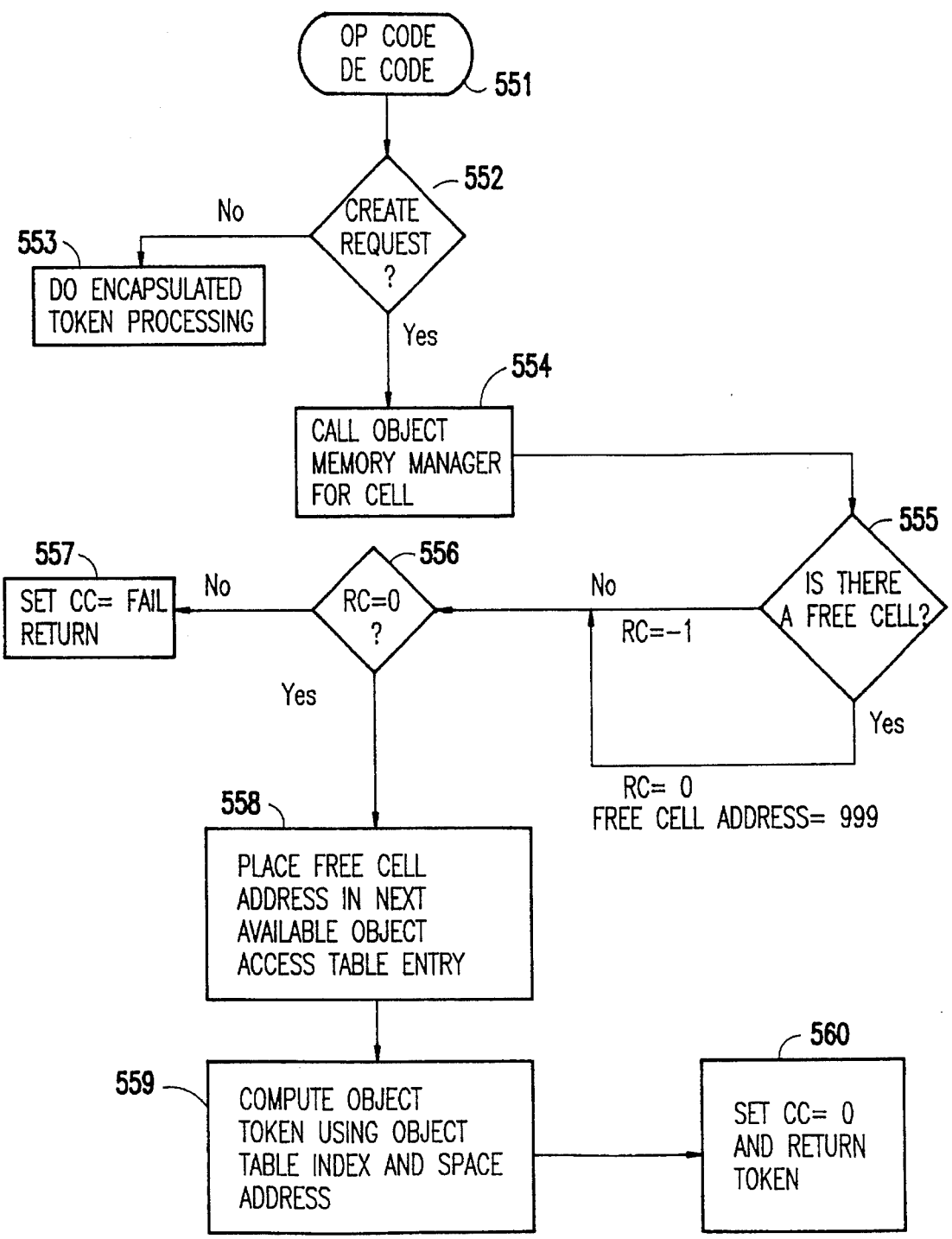
FIG. 16 is a flowchart illustrating the logic of the process that creates a token.
Figure 17:
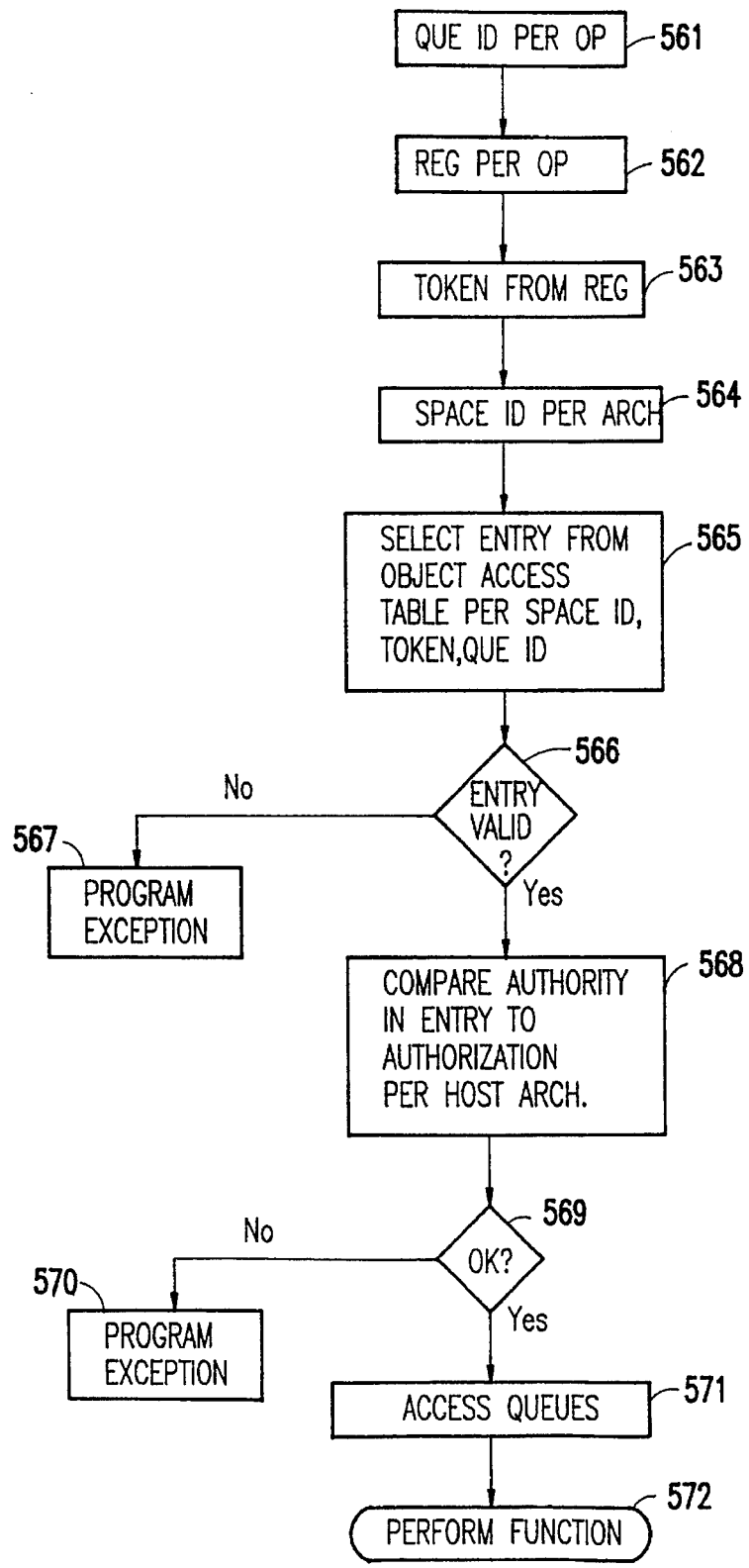
FIG. 17 is a flowchart of the encapsulated token processing.

FIG. 16 is a flowchart illustrating the logic of the process that creates a token. The process begins in function block 551 with the decoding of the operation code (opcode). A test is made in decision block 552 to determine if the opcode is a create request. If not, encapsulated token processing is performed in function block 553, the process for which is illustrated in the flowchart of FIG. 17, to which reference is made below. Assuming that the opcode is a create request, the object memory manager is called in function block 554. A test is made in decision block 555 by the object memory manager to determine if there is a free cell. If so, RC (return code) is set to "0"; otherwise, RC is set to "–1". A free cell test is then made in decision block 556 to determine if RC is "0".

The free cell test is required by this embodiment to detect over capacity application of the facility. This embodiment uses a finite object storage which has a limited capacity, hence fault indication must be provided to the application when capacity is exceeded. In a preferred embodiment, the object repository can be made to appear infinite by using virtual storage techniques.

Returning to FIG. 16, if RC is not "0", a failure is detected in function block 557 and a return is made, exiting the process. Assuming that RC is "0", indicating that a free cell is available, the free cell address is placed in the next available object access table entry in function block 558. Then, in function block 559, the object token is computed using the object table index and space address. CC is set to "0" in function block 560 and the created token is returned.

Returning to function block 553, encapsulated token processing is shown in the flowchart of FIG. 17, to which reference is now made. First, the identification (ID) of the operation is queued in function block 561. This is done by means of the TDQ, SRQ and SRC. Next, a register is selected for the operation in function block 562. The token is the address which is accessed from the register in function block 563. This address is associated with an address space ID defined by the host architecture in function block 564. Then, using an object access table which is accessed with the space ID, the token and the queue ID, an entry is selected in function block 565. The selected entry is tested in decision block 566 to determine if it is valid. If not, a program exception is returned in function block 567, but if valid, the authority in the entry is compared to authorization per the host architecture in function block 568. A further test is made in decision block 569 to determine if the compared authorization compared properly. If not, a prograin exception is returned in function block 570, but if there is proper authorization, the queues are accessed in function block 571, and the function of the encapsulated operations is performed in function block 572.

While the invention has been described in terms of specific preferred embodiment implemented in hardware and software, those skilled in the art will recognize that the invention can be practiced with modification within the spirit and scope of the appended claims.

What is claimed is:

1. A small grain facility for controlling the execution of and communication between interacting computer program processes in a parallel computer system, comprising:

object repository means for storing communication resources including a plurality of message data structures used to store and pass messages between said computer program processes, a plurality of thread dispatching data structures used to store process and program information about a state of said computer program processes, and a plurality of counter data structures used to store counts of occurrences of events within the stages of dispatching and completion of operations of said computer program processes, said object repository means not being addressable by any of said computer program processes;

parallel execution unit means communicating with said object repository means for executing operation functions of said message data structures, said thread dispatching data structures, and said counter data structures; and token processor means, connected to said object repository means, responsive to a request in a computer program process for generating a token, said token capable of being shared by a plurality of said computer program processes, said token controlling said parallel execution unit to manage communication resources of said parallel computer system by allowing said computer program process access to said communication resources when said token includes a valid context, and said token processor means being responsive to a request in a computer program process for associating said computer program process to said token.

2. The small grain facility recited in claim 1 wherein said token processor means comprises:

means responsive to said token, located in said token processor means, for preventing said computer program processes from accessing said communication resources with tokens which said computer program processes are not authorized to use.

3. The small grain facility recited in claim 2 further comprising state vector means, connected to said object repository means, responsive to said computer program processes for collecting and storing process and program information, messages, and counts resulting from execution of said computer program processes into said communication resources.

4. The small grain facility recited in claim 1 wherein said parallel computer system comprises a tightly coupled multiprocessor system having a plurality of processors mid a shared storage, each of said processors having an instruction unit and an execution unit, said object repository means comprising part of said shared storage and said parallel execution unit means being part of the execution unit of each of said processors.

5. The small grain facility recited in claim 1 wherein said parallel computer system comprises a loosely coupled multiprocessor system having a plurality of processors, each with a separate storage, each of said processors having an instruction unit and an execution unit, said object repository means comprising parts of said separate storages of each of said plurality of processors and said parallel execution unit means being part of the execution unit of each said processors.

6. The small grain facility recited in claim 1 wherein said parallel computer system comprises a combination of tightly coupled and loosely coupled multi-processor systems, said tightly coupled multi-processor system having a plurality of processors and a shared storage and said loosely coupled multi-processor system having a plurality of processors, each with a separate storage, each of said processors of said multiprocessor systems having an instruction unit and an execution unit, said object repository means comprising parts of said shared and separate storages and said object repository means controlling use of said parts of said shared and separate storages and said parallel execution unit means being part of the execution unit of each said processors.

7. A method of controlling the dispatching of computer program processes using a small grain facility, and the sharing of data between them, when being executed in parallel by a computer system with a plurality of processing units, said method comprising the steps of:

creating tokens upon a request by the computer program processes, said tokens for controlling communication resources;

binding the computer program processes to the tokens;

validating tokens bound to said computer program processes to yield addressing information for the control of the communication resources;

allocating, dynamically, data structures for the operations of storing and passing of messages between said computer program processes, storing information about a state of said computer program processes and about stages of dispatching and completion of operations in said computer program processes, and executing operations of said computer program processes;

passing messages between said computer program processes using data structures when said tokens are valid, said messages providing data and declaring information about stages of dispatching and of completion of operations;

passing information between said computer program processes about the state of said computer program processes before, during and after execution using data structures when said tokens are valid; and permitting idle physical processing units of the computer to dispatch said computer program processes to themselves for local execution.

8. The method recited in claim 7 further comprising the step of validating tokens when presented by computer program processes to gain control of the communication resources, identifying and rejecting invalid tokens, and permitting computer program processes to use and share tokens only when authorized, and wherein said step of allocating dynamically data structures is performed only upon presentation of validation of the tokens.

* * * * *